US011043666B2

(12) United States Patent
Kang et al.

(10) Patent No.: US 11,043,666 B2
(45) Date of Patent: Jun. 22, 2021

(54) COMPOSITE MATERIALS FOR CATHODE MATERIALS IN SECONDARY BATTERY, METHOD OF MANUFACTURING THE SAME, AND LITHIUM SECONDARY BATTERY INCLUDING THE SAME

(71) Applicant: SEOUL NATIONAL UNIVERSITY R&DB FOUNDATION, Seoul (KR)

(72) Inventors: Kisuk Kang, Seoul (KR); Sungkyun Jung, Yangju-si (KR); Taeghwan Hyeon, Seoul (KR); Myounghwan Oh, Seoul (KR); Min Gee Cho, Seoul (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 476 days.

(21) Appl. No.: 15/410,122

(22) Filed: Jan. 19, 2017

(65) Prior Publication Data

US 2017/0207449 A1    Jul. 20, 2017

(30) Foreign Application Priority Data

Jan. 19, 2016  (KR) .................. 10-2016-0006559
Jan. 13, 2017  (KR) .................. 10-2017-0006314

(51) Int. Cl.
*H01M 4/36* (2006.01)
*H01M 10/0525* (2010.01)
(Continued)

(52) U.S. Cl.
CPC .......... *H01M 4/364* (2013.01); *H01M 4/502* (2013.01); *H01M 4/523* (2013.01); *H01M 4/582* (2013.01);
(Continued)

(58) Field of Classification Search
CPC ...... H01M 4/364; H01M 4/523; H01M 4/502; H01M 4/582; H01M 10/0525; H01M 4/587; H01M 2004/028
See application file for complete search history.

(56) References Cited

U.S. PATENT DOCUMENTS

2004/0121235 A1* 6/2004 Amatucci ............. H01M 4/136
                                                        429/231.95
2011/0065001 A1* 3/2011 Pereira ................. C01G 49/00
                                                        429/219
(Continued)

FOREIGN PATENT DOCUMENTS

CN           101558518   * 10/2009   ............. H01M 4/58
KR        1020090080980       7/2009
(Continued)

OTHER PUBLICATIONS

Machine English translation of KR 10-2013-0130104225 (Year: 2013).*
(Continued)

*Primary Examiner* — Michael L Dignan
(74) *Attorney, Agent, or Firm* — Cantor Colburn LLP

(57) ABSTRACT

Disclosed are a composite material for cathode materials in a secondary battery, a method of manufacturing the same, and a lithium secondary battery including the same. A composite material for cathode materials in a secondary battery includes: a charge carrier ion compound-carbon composite including a carbon particle and a charge carrier ion compound particle represented by general formula of $A_xD_y$ and dispersed on a surface of the carbon particle; and a transition metal compound represented by a general formula of $M_zR_w$. In the general formulae of $A_xD_y$ and $M_zR_w$, A, D, M, R, x, y, z, and w are as defined in the detailed description.

18 Claims, 22 Drawing Sheets

(51) Int. Cl.
  H01M 4/58   (2010.01)
  H01M 4/587  (2010.01)
  H01M 4/50   (2010.01)
  H01M 4/52   (2010.01)
  H01M 4/02   (2006.01)

(52) U.S. Cl.
  CPC ....... *H01M 4/587* (2013.01); *H01M 10/0525* (2013.01); *H01M 2004/028* (2013.01)

(56) References Cited

U.S. PATENT DOCUMENTS

| | | | | |
|---|---|---|---|---|
| 2012/0032118 | A1* | 2/2012 | Fichtner | B82Y 30/00 252/503 |
| 2014/0170493 | A1* | 6/2014 | Holme | H01M 4/04 429/220 |
| 2015/0325841 | A1* | 11/2015 | Li | H01M 4/136 252/506 |

FOREIGN PATENT DOCUMENTS

| | | |
|---|---|---|
| KR | 1020130104225 | 9/2013 |
| KR | 1020130118672 | 10/2013 |
| KR | 101385001 | 4/2014 |
| KR | 1020140081954 | 7/2014 |

OTHER PUBLICATIONS

Fan et al. "In situ lithiated FeF3/C nanocomposite as high energy conversion-reaction cathode for lithium-ion batteries." Journal of Power Sources 307 (2016) 435-442 (Year: 2016).*

Maier et al. "Reversible Formation and Decomposition of LiF Clusters Using Transition Metal Fluorides as Precursors and Their Application in Rechargeable Li Batteries." Adv. Mater. 2003, 15, No. 9, May 2, 2003.*

Sina et al. "Microstructural Evolution of Iron Oxyfluoride/Carbon Nanocomposites Upon Electrochemical Cycling." J. Phys. Chem. C 120, 13375-13383 (2016) (Year: 2016).*

Li et al. "Reversible Electrochemical Conversion Reaction of Li2O/CuO Nanocomposites and Their Application as High-Capacity Cathode Materials for Li-Ion Batteries." J. Phys. Chem. C 2011, 115, 6167-6174 (Year: 2011).*

Cabana et al. "Beyond Intercalation-Based Li-Ion Batteries: The State of the Art and Challenges of Electrode Materials Reacting Through Conversion Reactions." Adv. Mater. 2010, 22, E170-E192 (Year: 2010).*

Wall et al. "Synthesis of [Co/LiF/C] nanocomposite and its application as cathode in lithium-ion batteries." Journal of Alloys and Compounds, 530 (2012) 121-126 (Year: 2012).*

Prakash et al. "Modified synthesis of [Fe/LiF/C] nanocomposite, and its application as conversion cathode material in lithium batteries." Journal of Power Sources 196 (2011) 5936-5944 (Year: 2011).*

Dimov et al. "Electrochemical Splitting of LiF: A New Approach to Lithium-ion Battery Materials." ECS Transactions, 58 (12) 87-99 (2014) (Year: 2014).*

Wang et al. "Extremely high-rate capacity and stable cycling of a highly ordered nanostructured carbon-FeF2 battery cathode." J. Mater. Chem. A., 2015, 3, 22377-22384 (Year: 2015).*

Ma et al. "Fabrication of LiF/Fe/Graphene Nanocomposites as Cathode Material for Lithium-Ion Batteries." ACS Appl. Mater. Interfaces, 2013, 5, 892-892 (Year: 2013).*

Machine English translation of CN101558518 (Year: 2009).*

Zhang et al. "Electrochemically activated MnO as a cathode material for sodium-ion batteries." Electrochemistry Communication 77 (2017) 81-84 (Year: 2017).*

G.G. Amatucci, et al., "Formation of lithium fluoride/metal nanocomposites for energy storage through solid state reduction of metal fluorides", Journal of Fluorine Chemistry, vol. 132, (2011), pp. 1086-1094.

Sung-Wook Kim, et al., "Energy storage in composites of a redox couple host and a lithium ion host", Nano Today, vol. 7, (2012), pp. 168-173.

Changbin Wang, et al., "Uniform Carbon Layer Coated Mn3O4 Nanorod Anodes with Improved Reversible Capacity and Cyclic Stability for Lithium Ion Batteries", ACS Appl. Mater. Interfaces, (2012), vol. 4, pp. 1636-1642.

* cited by examiner

COMPOSITE MATERIALS FOR CATHODE MATERIALS IN SECONDARY BATTERY, METHOD OF MANUFACTURING THE SAME, AND LITHIUM SECONDARY BATTERY INCLUDING THE SAME

FUNDING STATEMENT

This invention was supported by Samsung Research Funding Center of Samsung Electronics under Project Number SRFC-TA1403-03.

CROSS-REFERENCE TO RELATED APPLICATION

This application claims priority to and the benefit of Korean Patent Application No. 10-2016-0006559 filed in the Korean Intellectual Property Office on Jan. 19, 2016, and Korean Patent Application No. 10-2017-0006314 filed in the Korean Intellectual Property Office on Jan. 13, 2017, the entire contents of which are incorporated herein by reference.

BACKGROUND

1. Field

Composite materials for cathode materials in a secondary battery, methods of manufacturing the same, and lithium secondary batteries including the same are disclosed.

2. Description of the Related Art

A secondary battery is a battery that is capable of being continuously and repeatedly charged and discharged, and the secondary battery is operated by transferring electrons between two electrodes having a huge difference of ionization tendency according to a reversible redox reaction.

Among secondary batteries, a lithium secondary battery is commonly used, and a lithium-transition metal compound including both lithium and a transition metal is used as a cathode material for the lithium secondary battery. Thus a variety of lithium transition metal compounds have been suggested for a candidate group of cathode materials for a secondary battery. In the lithium-transition metal compound, lithium transfers charges through an electrolyte, and the transition metal supplies electrons required for a reaction through a redox reaction.

Generally, the lithium-transition metal compound may have a particular crystal structure including a transition metal, a charge carrier ion (Li ion), and the like, and it may have a sufficient energy level to apply the lithium-transition metal compound for a cathode.

Examples of the particular crystal structure include a $LiMO_2$-based layered structure compound, $LiM_2O_4$-based spinel, a $LiMPO_4$-based olivine compound, and the like. When satisfying the conditions, Li ions may work for a cathode of the secondary battery by being intercalated and/or deintercalated in the crystal structure.

However, a material group satisfying all the conditions does not exist in the natural world, so the range of the applicable cathode material is limited. Accordingly, it has been required to develop a novel cathode material to provide high energy density, even while not satisfying all of the conventional conditions of cathode materials.

SUMMARY

Provided are composite materials for cathode materials in a secondary battery, even while not satisfying all of the conventional conditions of cathode materials, but that are able to be used for a cathode active material, a method thereof, and a lithium secondary battery including the same.

One embodiment provides a composite material for cathode materials in a secondary battery including: a charge carrier ion compound-carbon composite including a carbon particle and a charge carrier ion compound particle represented by a general formula of $A_xD_y$ and dispersed on a surface of the carbon particle; and a transition metal compound represented by a general formula of $M_zR_w$.

The A is selected from Li, Na, K, Rb, Cs, Be, Mg, Ca, Sr, and Ba, the D is selected from F, O, N, Cl, S, P, Br, Se, I, (OH), and ($CO_3$), the M is selected from Fe, Mn, V, Co, Ni, Cu, Ti, Nb, Mo, Y, Ag, Hf, and Ta, the R is selected from O, C, F, S, Cl, Se, I, N, H, ($NO_3$), ($PO_4$), ($SO_4$), ($P_2O_7$), ($SO_4$), ($CO_3$), ($BO_3$), and ($SO_4F$), $0 < x \le 3$, $0 < y \le 2$, $0 < z \le 4$, and $0 < w \le 6$.

The charge carrier ion compound-carbon composite and the transition metal compound may have phases that are distinguished from each other.

Each of the charge carrier ion compound particle and the carbon particle is a particle having a nanometer size, and the charge carrier ion compound particle may be uniformly mixed with the carbon particle in the charge carrier ion compound-carbon composite.

The charge carrier ion compound-carbon composite may distributed at least adjacent to the surface of the transition metal compound.

The charge carrier ion compound particle may be generally dispersed in an area adjacent to the surface of the transition metal compound.

The carbon particle may be an amorphous carbon particle.

The carbon particle may have a particle diameter of about 10 nm to about 100 nm.

The charge carrier ion compound particle may include a crystalline first particle and an amorphous second particle.

The charge carrier ion compound particle may have a particle diameter of about 5 nm to about 100 nm.

The charge carrier ion compound particle may include at least one selected from LiF, $Li_2O$, $Li_3N$, LiI, LiCl, $Li_2S$, LiOH, $Li_2CO_3$, LiBr, $Li_3PO_4$, $Li_4P_2O_7$, $Li_2SO_4$, $Li_2CO_3$, $Li_4SiO_4$, $Li_2O_2$, KF, and NaF.

The transition metal compound may have crystallinity.

The transition metal compound may include at least one selected from MnO, $Mn_2O_3$, $Mn_3O_4$, CoO, $Co_3O_4$, FeO, $Fe_2O_3$, $Fe_3O_4$, $V_2O_5$, NiO, $Nb_2O_5$, $MoO_3$, and $FeF_3$.

Meanwhile, according to one embodiment, a method of preparing a composite material for cathode materials in a secondary battery includes: mixing a charge carrier ion compound precursor and a carbon precursor using a mechanochemical reaction to provide the charge carrier ion compound-carbon composite; and adding the transition metal compound into the charge carrier ion compound-carbon composite.

The mechanochemical reaction may be performed using a high energy ball mill method.

While adding the transition metal compound, at least one of a binder, a conductive material, and a solvent may be further added thereto.

The charge carrier ion compound-carbon composite and the transition metal compound may be mixed by physical agitation.

Another embodiment provides a lithium secondary battery including: an electrolyte; an anode; a cathode including a charge carrier ion compound-carbon composite including a carbon particle and a charge carrier ion compound particle represented by $A_xD_y$ and dispersed on a surface of the carbon particle and a transition metal compound represented by a general formula of $M_zR_w$, and a separator.

The A is selected from Li, Na, K, Rb, Cs, Be, Mg, Ca, Sr, and Ba, the D is selected from F, O, N, Cl, S, P, Br, Se, I, (OH), and ($CO_3$), the M is selected from Fe, Mn, V, Co, Ni, Cu, Ti, Nb, Mo, Y, Ag, Hf, and Ta, the R is selected from O, C, F, S, Cl, Se, I, N, H, ($NO_3$), ($PO_4$), ($SO_4$), ($P_2O_7$), ($SiO_4$), ($CO_3$), ($BO_3$), and ($SO_4F$), $0<x\leq3$, $0<y\leq2$, $0<z\leq4$, and $0<w\leq6$.

In the cathode, charge carrier ions may be oxidized and reduced on a surface of the transition metal compound.

At a state of charging the lithium secondary battery, the charge carrier ion compound is separated into a charge carrier ion and an anion, and the anion may be chemically bonded with the transition metal compound.

The anion may be generally dispersed on a surface of the transition metal compound.

One embodiment provides a composite material for cathode materials in a secondary battery, even while not satisfying all requirements of the conventional cathode materials, but that is able to be used as a cathode active material, and a lithium secondary battery including the same.

In addition, the composite materials for cathode materials may be provided by a relatively simple method.

DETAILED DESCRIPTION

Exemplary embodiments will hereinafter be described in detail, and may be easily realized by those who have common knowledge in the related art. However, this disclosure may be embodied in many different forms, and is not to be construed as limited to the exemplary embodiments set forth herein.

The terms in the embodiments are for describing a particular exemplary embodiment but are not for limiting the present disclosure. A single expression also includes a plurality unless clearly expressed otherwise. In this specification, the terms "include" or "have" and the like may be understood to designate the presence of a number, step, operation, constituent elements, member, or a combination thereof, but not to exclude the presence or a possibility of adding a number, step, operation, constituent elements, member, or a combination thereof.

Hereinafter, embodiments are described in detail. However, these embodiments are exemplary, the present disclosure is not limited thereto, and the present disclosure is defined by the scope of claims.

In addition, for a particle diameter of a particle in the present disclosure, although it may be numerized by a measurement to show an average size of a group, the generally used method includes using a mode diameter showing the maximum value of the distribution, a median diameter corresponding to the center value of integral distribution curve, a variety of average diameters (numeral average, length average, area average, mass average, volume average, etc.), and the like. Unless particularly mentioned otherwise, an average particle diameter means a numeral average diameter in the present disclosure, and it is obtained by measuring D50 (particle diameter at a position of distribution rate of 50%).

Figure 1:
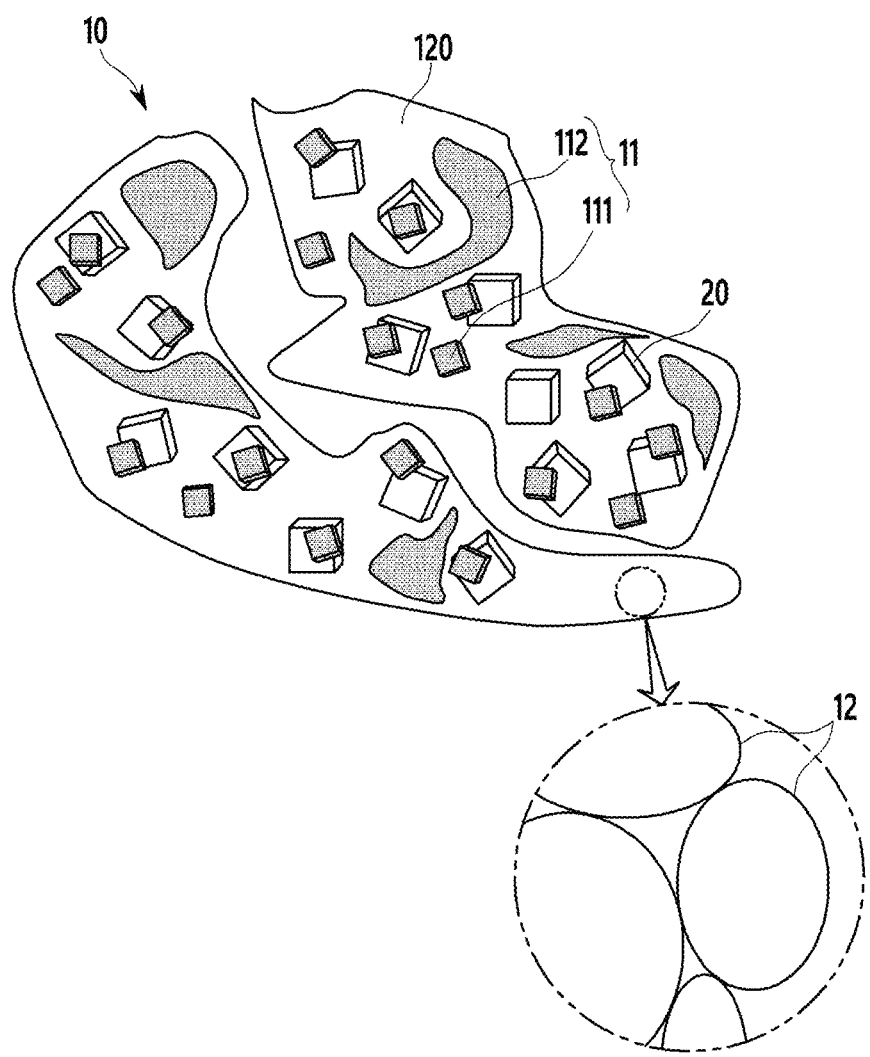
FIG. 1 is a schematic view showing composite materials for cathode materials in a secondary battery according to an example embodiment.

FIG. 1 schematically shows composite materials for cathode materials in a secondary battery according to an example embodiment.

Referring to FIG. 1, the composite materials for cathode materials in a secondary battery according to one embodiment include a charge carrier ion compound-carbon composite 10 and a transition metal compound 20.

The charge carrier ion compound-carbon composite 10 may have a distinguishing phase from the transition metal compound 20. For example, the charge carrier ion compound-carbon composite 10 may have a phase similar to a random shape, and the transition metal compound 20 may have predetermined granularity or a crystal phase.

In one embodiment, the charge carrier ion compound-carbon composite 10 may be physically mixed with the transition metal compound 20. That is, unless the composite materials for cathode materials in a secondary battery are supplied with energy from the outside, the charge carrier ion compound-carbon composite 10 and the transition metal compound 20 may be in a state of having no additional strong chemical bonds but only having weak bonds such as dispersion force, Van der Waals bond, and the like.

In the composite materials for cathode materials in a secondary battery, the charge carrier ion compound-carbon composite 10 may surround the surface of the transition metal compound 20, as shown in FIG. 1. In other words, the composite materials for cathode materials in a secondary battery may have a structure in which the transition metal compound 20 is dispersed in a so-called matrix including the charge carrier ion compound-carbon composite 10.

The charge carrier ion compound-carbon composite 10 includes a charge carrier ion compound particle 11 and a carbon particle 12. In the charge carrier ion compound-carbon composite 10, the carbon particle 12 and the charge carrier ion compound particle 11 are pulverized into a several nanometer size to a several hundreds of nanometer size, and combined between the charge carrier ion compound particle 11 and the carbon particle 12. The charge carrier ion compound particle 11 is dispersed on a surface of the carbon particle 12.

Furthermore, parts of the charge carrier ion compound particle 11 and the carbon particle 12 may each be agglomerated to provide a kind of matrix 120, as shown in FIG. 1. In other words, the charge carrier ion compound-carbon composite 10 may have a structure in which charge carrier ion compound particles 11 are dispersed in a carbon matrix 120 of an agglomeration of at least two carbon particles 12 and combined, as shown in FIG. 1.

According to one embodiment, the charge carrier ion compound particle 11 may be uniformly mixed with the carbon particle 12 in the charge carrier ion compound-carbon composite 10. However, one embodiment is not necessarily limited to the dispersion aspect of the carbon particle and the charge carrier ion compound particle, and it may have different dispersion aspects depending upon a state of a charge carrier ion compound-carbon composite.

The charge carrier ion compound particle 11 may have a general formula of $A_xD_y$. Herein, the A may be an element selected from Li, Na, K, Rb, Cs, Be, Mg, Ca, Sr, and Ba, the D may be an element or an atomic group selected from F, O, N, Cl, S, P, Br, Se, I, (OH), and $CO_3$, $0<x \leq 3$, and $0<y \leq 2$.

The charge carrier ion compound particle 11 may be, for example, at least one selected from LiF, $Li_2O$, $Li_3N$, LiI, LiCl, $Li_2S$, LiOH, $Li_2CO_3$, LiBr, $Li_3PO_4$, $Li_4P_2O_7$, $Li_2SO_4$, $Li_2CO_3$, $Li_4SiO_4$, $Li_2O_2$, KF, and NaF.

In the charge carrier ion compound particle 11, the element of A and the element or atomic group of D may form an ionic bond at a predetermined position in the crystal structure.

In one embodiment, the charge carrier ion compound particle 11 may include a crystalline first particle 111 and an amorphous second particle 112, as shown in FIG. 1. In other words, the first particle 111 and the second particle 112 may simultaneously exist in the carbon matrix.

The charge carrier ion compound particle 11 may exemplarily have a particle diameter of greater than or equal to about 1 nm, greater than or equal to about 5 nm, greater than or equal to about 10 nm, greater than or equal to about 15 nm, or greater than or equal to about 20 nm, and exemplarily less than or equal to about 100 nm, less than or equal to about 90 nm, less than or equal to about 80 nm, less than or equal to about 70 nm, less than or equal to about 60 nm, less than or equal to about 50 nm, less than or equal to about 40 nm, less than or equal to about 30 nm, or less than or equal to about 20 nm.

When the particle diameter of the charge carrier ion compound particle 11 satisfies the range, very tiny particles may be densely dispersed on the surface of the carbon particle 12 as particles are pulverized. Thereby, the performance of composite materials for cathode materials in a secondary battery may be improved as the contact area between the transition metal compound 20 and the charge carrier ion compound particle 11 is maximized.

The carbon particle 12 is uniformly mixed with the charge carrier ion compound particle 12 as shown in FIG. 1.

In one embodiment, the carbon particle 12 may be an amorphous carbon particle. The carbon particle 12 may be obtained using a commercially available carbon-based material. Examples of the carbon-based material may include carbon black, graphite, activated carbon, or a combination thereof.

The carbon particle 12 may enhance conductivity of the carrier ion compound particle 11, so as to encourage generation of a chemical reaction according to Reaction Scheme 1.

The carbon particle 12 may be chemically bonded with an anion emitted from the charge carrier ion compound particle 12 in a charge/discharge state of a secondary battery. The electrochemical activity of the carbon particle 12 will be described later.

The carbon particle 12 may exemplarily have a particle diameter of greater than or equal to about 1 nm, greater than or equal to about 5 nm, or greater than or equal to about 10 nm, and of less than or equal to about 100 nm, less than or equal to about 90 nm, less than or equal to about 80 nm, less than or equal to about 70 nm, less than or equal to about 60 nm, or less than or equal to about 50 nm.

When a particle diameter of the carbon particle 12 satisfies the range, the charge carrier ion compound particle 11 is densely dispersed on the surface of the carbon particle 12 as the particles are pulverized. Thus, the contact area between the transition metal compound 20 and the charge carrier ion compound particle 11 may be maximized to improve the performance of composite materials for cathode materials in a secondary battery.

The transition metal compound 20 may be represented by a general formula of $M_zR_w$, wherein the M may be a transition metal atom selected from Fe, Mn, V, Co, Ni, Cu, Ti, Nb, Mo, Y, Ag, Hf, and Ta, the R is an element or an atomic group selected from O, C, F, S, Cl, Se, I, N, H, $(NO_3)$, $(PO_4)$, $(SO_4)$, $(P_2O_7)$, $(SiO_4)$, $(CO_3)$, $(BO_3)$, $(SO_4F)$, $0<z \leq 4$, and $0<w \leq 6$.

The transition metal compound 20 may be, for example, at least one selected from MnO, $Mn_2O_3$, $Mn_3O_4$, CoO, $Co_3O_4$, FeO, $Fe_2O_3$, $Fe_3O_4$, $V_2O_5$, NiO, $Nb_2O_5$, $MoO_3$, and $FeF_3$.

In one embodiment, the transition metal compound 20 may be crystalline. That is, in the transition metal compound 20, the transition metal element of M, and the element or the atomic group of R may form an ionic bond at a predetermined position in a crystal structure.

The transition metal compound 20 may have a monocrystalline particle including an anion and a transition metal element disposed at a predetermined position in the crystal structure, or a polycrystalline particle including at least two monocrystal particles.

Meanwhile, according to one embodiment, a particle diameter of the transition metal compound 20 is not particularly limited. In other words, the transition metal compound 20 may have a wide range of particle diameter while maintaining crystallinity. The transition metal compound 20 may have a particle diameter of, for example, several to several hundreds of nanometers, and may have a particle diameter in a sub-micron to several hundred micron size.

Thus, the size of the transition metal compound 20 may be variously adjusted according to usage of composite materials for cathode materials in a secondary battery according to one embodiment, a kind of the charge carrier ion, and the like.

Hereinafter, a lithium secondary battery including composite materials for cathode materials in a secondary battery is described.

The lithium secondary battery according to one embodiment may include an electrolyte, an anode, a cathode including the composite materials for cathode materials in a secondary battery, and a separator.

The electrolyte may include a non-aqueous organic solvent and a lithium salt. The non-aqueous organic solvent serves as a medium for transmitting ions taking part in the electrochemical reaction of a battery. Examples of the non-aqueous organic solvent may be a carbonate-based, ester-based, ether-based, ketone-based, alcohol-based, or aprotic solvent.

Examples of the carbonate based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

Examples of the ester-based solvent may be methyl acetate, ethyl acetate, n-propyl acetate, dimethyl acetate, methyl propionate, ethyl propionate, γ-butyrolactone, decanolide, valerolactone, mevalonolactone, caprolactone, and the like.

Examples of the ether solvent may be dibutyl ether, tetraglyme, diglyme, dimethoxyethane, 2-methyltetrahydrofuran, tetrahydrofuran, and the like, examples of the ketone-based solvent may be cyclohexanone and the like, and examples of the alcohol-based solvent may be ethanol, isopropyl alcohol, and the like.

The non-aqueous organic solvent may be used alone or in a mixture. When the non-aqueous organic solvent is used in a mixture, the mixture ratio may be controlled in accordance with desirable performance of a secondary battery. The non-aqueous electrolyte may further include an additive of an overcharge inhibitor such as ethylene carbonate, pyrocarbonate, and the like.

The lithium salt dissolved in an organic solvent supplies a battery with lithium ions, basically operates the secondary battery, and improves transportation of metal ions between a cathode and an anode.

Examples of the lithium salt include at least one supporting salt selected from $LiPF_6$, $LiBF_4$, $LiSbF_6$, $LiAsF_6$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato)borate; LiBOB).

The anode includes a current collector and an anode active material layer disposed on the current collector.

The current collector may be a copper foil, a nickel foil, a stainless steel foil, a titanium foil, a nickel foam, a copper foam, a polymer substrate coated with a conductive metal, or a combination thereof, but is not limited thereto.

The anode active material layer includes an anode active material, a binder, and optionally a conductive material.

The anode active material may include, for example, a material reversibly intercalating and deintercalating lithium ions or a transition metal oxide.

The material reversibly intercalating and deintercalating lithium ions may be any generally-used carbon-based anode active material in a lithium secondary battery as a carbon material, and examples thereof may be crystalline carbon, amorphous carbon, or a mixture thereof. Examples of the crystalline carbon may be graphite such as amorphous, sheet-shaped, flake-shaped, spherical-shaped, or fiber-shaped natural graphite or artificial graphite, and examples of the amorphous carbon may be soft carbon (carbon fired at a low temperature) or hard carbon, a mesophase pitch carbonized product, fired coke, and the like.

Examples of the transition metal oxide may be vanadium oxide, lithium vanadium oxide, and the like.

The binder improves binding properties of anode active material particles and simultaneously anode active materials to a current collector. Examples thereof may be polyvinyl alcohol, carboxymethyl cellulose, hydroxypropyl cellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, epoxy resin, nylon, and the like, but are not limited thereto.

The conductive material is included to provide electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The cathode may include a current collector and the composite materials for cathode materials in a secondary battery disposed on the current collector, and may further include a binder, a conductive material, and the like.

The composition for composite materials for cathode materials is the same as above.

In the cathode of the lithium secondary battery according to one embodiment, the oxidation/reduction of the charge carrier ion may occur on the surface of the transition metal compound, unlike the conventional cathode, but one embodiment is not necessarily limited thereto. The chemical reaction occurring in the cathode of the lithium secondary battery according to one embodiment will be described later.

The binder improves binding properties of composite materials for cathode materials in a secondary battery and simultaneously composite materials for cathode materials in a secondary battery to a current collector. Examples thereof may be carboxylmethyl cellulose, hydroxyethyl cellulose, hydroxypropyl cellulose, hydroxypropyl methylcellulose, polyvinylidene fluoride, polytetrafluoroethylene, polyethylene, polypropylene, styrene-butadiene rubber, polybutadiene, butyl rubber, fluorine rubber, polyethylene oxide, polyvinyl alcohol, poly(meth)acrylic acid and a salt thereof, polyvinylpyrrolidone, polyepichlorohydrin, polyphosphazene, polyacrylonitrile, polystyrene, poly(vinylpyridine), chlorosulfonated polyethylene, latex, a polyester resin, an acrylic resin, a phenolic resin, an epoxy resin, a polymer of propylene and a C2 to C8 olefin, a copolymer of (meth)acrylic acid and (meth)acrylic acid alkyl ester, and the like. However, an embodiment is not limited thereto.

The conductive material, which is used to provide conductivity to an electrode, may include any materials as long as having electron conductivity while not causing a chemical change. Examples of the conductive material may include natural graphite, artificial graphite, carbon black, acetylene black, ketjen black, carbon fiber, carbon nanotubes, and the like, and may also include copper, nickel, aluminum, silver, and the like as a metal powder or a metal fiber, and the like, and it may be used singularly or by being mixed with at least one kind of conductive polymer such as a polyphenylene derivative and the like.

The separator may include any materials commonly used in a conventional lithium secondary battery as long as it separates the anode and the cathode and provides a transporting passage of lithium ions. For example, it may have low resistance to ion transport of an electrolyte and excellent impregnation for an electrolyte solution. For example, it may be selected from glass fiber, polyester, polyethylene, polypropylene, polytetrafluoroethylene (PTFE), or a combination thereof. It may have a form of a non-woven fabric or a woven fabric. For example, for the lithium ion battery, a polyolefin-based polymer separator such as polyethylene, polypropylene, or the like is mainly used. In order to ensure heat resistance or mechanical strength, a coated separator including a ceramic component or a polymer material may be used. Optionally, it may have a mono-layered or multi-layered structure.

Hereinafter, the principle that composite materials for cathode materials in a secondary battery work as a cathode in the lithium secondary battery according to one embodiment will be described.

When a lithium secondary battery is charged, a charge carrier ion compound particle 11 according to one embodiment is separated into a charge carrier ion of $A^{m+}$ and an anion of $D^{n-}$, Herein, each of m and n is a natural number, and m and n may be the same as or different from each other.

That is, the chemical reaction generated in the charge carrier ion compound particle 11 during the charge may be represented by the following Reaction Scheme 1.

$$A_xD_y \rightarrow x \cdot A^{m+} + y \cdot D^{n-}$$ [Reaction Scheme 1]

Meanwhile, when the lithium secondary battery is charged, the charge carrier ion compound particle 11 according to one embodiment may be chemical bonded with an anion $D^{n-}$ obtained from the charge carrier ion compound particle 11. The chemical reaction may be represented by the following Reaction Scheme 2.

$$M_zR_w + D^{n-} \rightarrow M_zR_w\_D$$ [Reaction Scheme 2]

In one embodiment, the transition metal compound 20 has crystallinity, and the chemical reaction according to Reaction Scheme 2 is generated on a surface of the transition metal compound 20. Thus, in a state that a lithium secondary battery is charged, charge carrier ion compound particles 11 are generally distributed in an area adjacent to the surface of the transition metal compound 20, and anions $D^{n-}$ among them may be generally distributed on the surface of the transition metal compound 20 by being chemically bonded with the transition metal compound 20. Accordingly, in a state that a secondary battery is charged, the transition metal compound 20 may be bonded with an anion $D^{n-}$ to be oxidized.

Meanwhile, in a state that a lithium secondary battery is discharged, a reverse reaction to that of Reaction Scheme 2 occurs to generate an anion $D^{n-}$, and then it is recombined with a charge carrier ion $A^{m+}$ to provide $A_xD_y$. In this case, the entire chemical reaction occurring in a state in which composite materials for cathode materials in a secondary battery are charged/discharged may be represented by Reaction Scheme 3.

$$A_xD_y \Leftrightarrow x \cdot A^{m+} + y \cdot M_zR_w\_D$$ [Reaction Scheme 3]

The chemical reaction according to Reaction Scheme 3 is reversible, so composite materials for cathode materials in a secondary battery according to one embodiment may work as a cathode for a secondary battery having a charge/discharge cycle according to Reaction Scheme 3.

According to one embodiment, the transition metal compound, conventionally known to have no electrochemical activity as a cathode, may also repeat redox reactions according to Reaction Scheme 3. Composite materials for cathode materials in a secondary battery according to one embodiment may work as a cathode for a secondary battery having a charge/discharge cycle according to Reaction Scheme 3.

However, the electrochemical activity of composite materials for cathode materials in a secondary battery according to one embodiment is not limited to only the above reaction schemes. Composite materials for cathode materials in a secondary battery according to one embodiment may work as a cathode for a lithium secondary battery having different charge/discharge cycles from those according to the above reaction schemes depending upon, for example, a kind of a transition metal compound 20.

For example, a charge carrier ion compound particle 11 according to one embodiment may be separated into $A^{m+}$ and $D^{n-}$ according to Reaction Scheme 1 in a state that a secondary battery is charged, but $D^{n-}$ may be chemically bonded with a carbon particle 12 instead of the transition metal compound 20 as shown in Reaction Scheme 2.

Thereafter, the compound of the carbon particle 12 and the D element may stably maintain a chemical bond even if the secondary battery repeats the charge and discharge. In other words, it may provide C-D having better electronegativity than commonly used carbon, and in this case, C-D helps to improve the performance of the secondary battery.

The entire chemical reaction generated in a state when composite materials for cathode materials in a secondary battery are charged/discharged may be represented by Reaction Scheme 4.

$$A_xD_y + C + M_zR_w \rightarrow x \cdot A^{m+} + y \cdot C-D \Leftrightarrow x \cdot A - M_zR_w + y \cdot C-D$$

In other words, unlike Reaction Scheme 3, in Reaction Scheme 4, $A^{m+}$ and $A-M_xR_w$ may repeat redox reactions. Accordingly, composite materials for cathode materials in a secondary battery according to one embodiment work as a cathode of a secondary battery having a charge/discharge cycle according to Reaction Scheme 4.

The general lithium transition metal compound used as a cathode material of a lithium secondary battery is required to have a particular crystal structure including a transition metal, a charge carrier ion (Li ion), and the like, and to have a sufficient energy level to be applied for a cathode, so the available cathode materials are limited.

However, composite materials for cathode materials in a secondary battery according to one embodiment are not limited to the conventional particular crystal structure or energy level. That is, as composite materials for cathode materials in a secondary battery according to one embodiment include a composite in which the charge carrier ion compound particle and the carbon particle are combined and a transition metal oxide includes no lithium, it may provide a novel type of cathode material composites which are not limited by the conventional particular crystal structure or energy level.

Thus, the composite materials for cathode materials in a secondary battery according to one embodiment may employ a variety of materials which have not been used as the conventional cathode, for example, manganese oxide or the like which used to be conventionally applied only for anode materials.

Hereinafter, a method of fabricating composite materials for cathode materials in a secondary battery will be described.

First, a charge carrier ion compound precursor and a carbon precursor are each prepared.

The charge carrier ion compound precursor may be, for example, a granular or powdery metal salt including at least one selected from the group consisting of LiF, $Li_2O$, $Li_3N$, LiI, LiCl, $Li_2S$, LiOH, $Li_2CO_3$, KF, and NaF.

The carbon precursor may be, for example, a granular or powdery metal salt including at least one selected from the group consisting of hard carbon, soft carbon, graphite, and carbon black.

Thereafter, the prepared charge carrier ion compound precursor and carbon precursor are mixed and mechanochemically reacted using a mechanochemical reaction, so as to provide a charge carrier ion compound-carbon composite of which the charge carrier ion compound particle and the carbon precursor are combined. The mechanochemical reaction method may be performed using a high-energy ball mill method.

According to one embodiment, a weight ratio of the charge carrier ion compound precursor and the carbon precursor introduced into the high-energy ball mill equipment may be, for example, about 1:0.3 to about 1:3, about 1:0.5 to about 1:2, or about 1:1. However, the weight ratio is only exemplary, and may be variously changed according to the kind of the charge carrier ion compound and the kind of the transition metal compound to be used.

Through a high-energy ball mill, the charge carrier ion compound precursor may be ground and pulverized into a plurality of charge carrier ion compound particles, and the carbon precursor may be ground and pulverized into a plurality of carbon particles. In addition, through a high energy ball mill, the charge carrier ion compound particles and the carbon particles may be uniformly mixed as described above.

The high energy ball mill process may be carried out at room temperature, and may be performed under an air or inert atmosphere such as Ar, Ne, and $N_2$.

A transition metal compound is then added into the obtained charge carrier ion compound-carbon composite. According to one embodiment, when adding a transition metal compound, at least one of a binder, a conductive material, and a solvent may be further added together with the transition metal compound.

The binder is added to well bind the composite materials for cathode materials in a secondary battery with each other and may include, for example, carboxylmethyl cellulose, hydroxyethyl cellulose, hydroxypropyl cellulose, hydroxypropyl methylcellulose, polyvinylidene fluoride, polytetrafluoroethylene, polyethylene, polypropylene, styrene-butadiene rubber, polybutadiene, butyl rubber, fluorine rubber, polyethylene oxide, polyvinyl alcohol, poly(meth)acrylic acid and a salt thereof, polyvinylpyrrolidone, polyepichlorohydrin, polyphosphazene, polyacrylonitrile, polystyrene, polyvinyl pyridine, chlorosulfonated polyethylene, latex, a polyester resin, an acrylic resin, a phenol resin, an epoxy resin, a polymer of propylene and olefin having a carbon number of 2 to 8, a copolymer of (meth)acrylic acid and alkyl (meth)acrylate, and the like.

The conductive material is used for providing conductivity to an electrode, and is not particularly limited as long as a material has electronic conductivity while not causing a chemical change for each of the charge carrier ion compound-carbon composite and the transition metal compound. Examples of conductive materials include natural graphite, artificial graphite, carbon black, acetylene black, ketjen black, carbon fiber, carbon nanotubes, and the like, and may also include metal powder or metal fiber such as copper, nickel, aluminum, silver, and the like, and it may be used as one kind or as a mixture of at least one kind of conductive polymer such as a polyphenylene derivative, and the like.

The solvent is used to dissolve and disperse a charge carrier ion compound-carbon composite, a transition metal compound, a binder, and a conductive material, and examples of the solvent may include an organic solvent such as NMP (N-methyl pyrrolidone), DMF (dimethyl formamide), acetone, dimethyl acetamide, and the like, or water, and the solvents may be used singularly or as a mixture of at least two kinds thereof.

Thereafter, unlike the above process of forming a charge carrier ion compound-carbon composite, the charge carrier ion compound-carbon composite and the transition metal compound are simply mixed using physical agitation, so as to provide composite materials for cathode materials in a secondary battery according to one embodiment.

Hereinafter, the present disclosure is illustrated in more detail with reference to examples. However, these examples are exemplary, and the present disclosure is not limited thereto.

Preparation Example

Preparation of LIF—C Composite

LiF powder (Sigma-Aldrich) having a particle diameter range from about 1 micron to about 2 microns and graphite powder (Alfa Aesar) having a particle diameter range from about 1 micron to about 20 microns were introduced at a weight ratio of 1:1 into planetary ball mill equipment (Fritsch, Pulverisette 5) and mixed by a high energy ball mill at a speed of about 400 rpm under an Ar atmosphere for about 48 hours without an idle period to provide a LiF—C composite in which pulverized LiF particles and carbon particles were uniformly dispersed.

Measurement Example 1

Microstructure of LIF—C Composite

Figure 2:
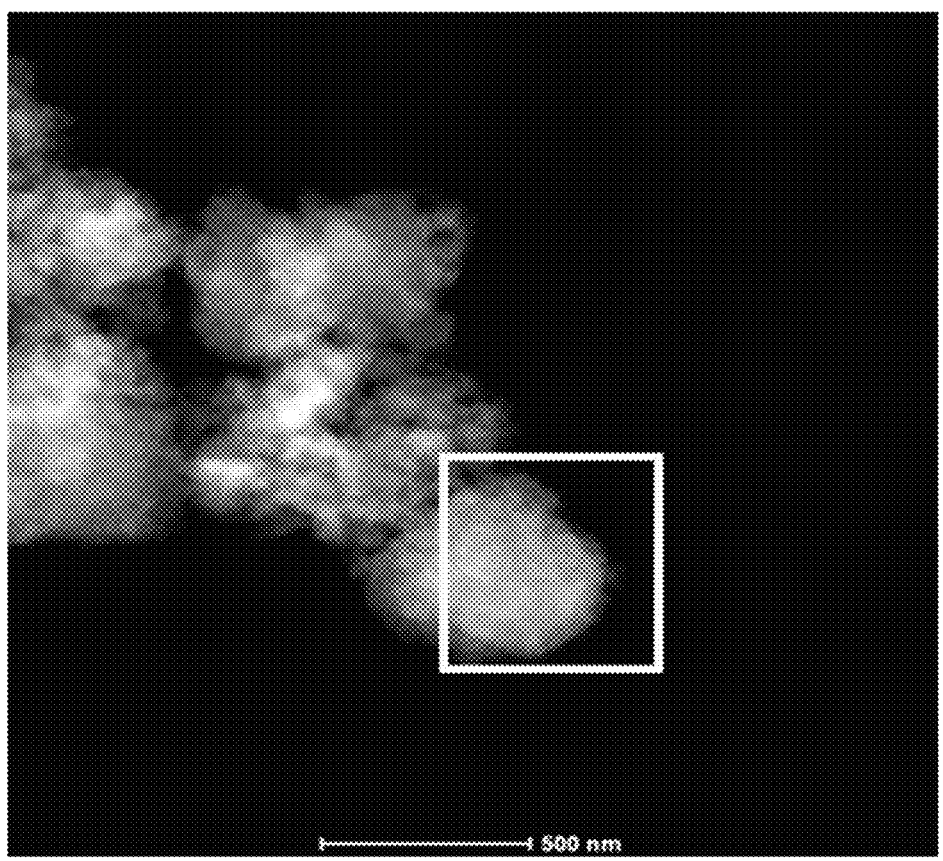
FIG. 2 is a STEM (scanning transmission electron microscopy) image showing a LiF—C composite according to a preparation example.
Figure 3:
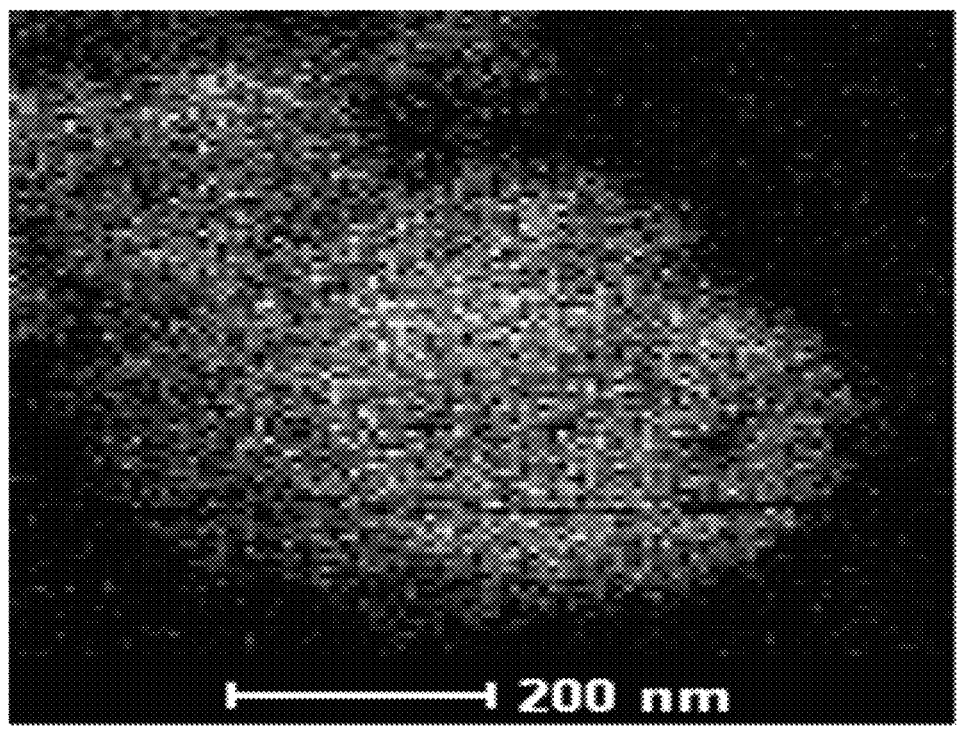
FIG. 3 and FIG. 4 show a part of FIG. 2 while highlighting each element in the LiF—C composite, wherein FIG. 3 highlights C and FIG. 4 highlights F.
Figure 4:
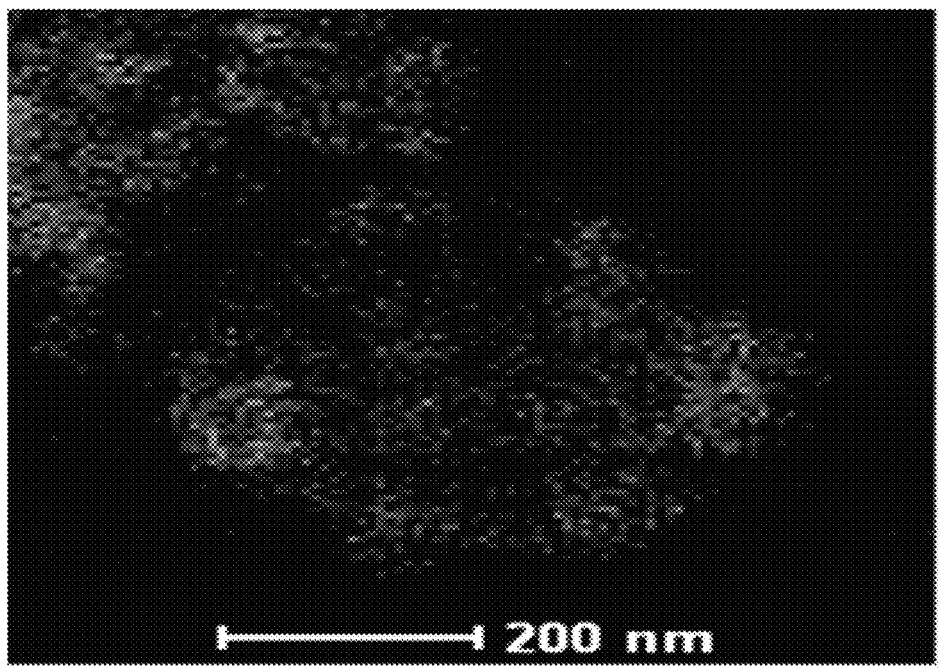

FIG. 2 shows a STEM (scanning transmission electron microscopy) image of a LiF—C composite according to a preparation example, and FIG. 3 and FIG. 4 show a part of FIG. 2 while highlighting each element in the LiF—C composite, wherein FIG. 3 highlights C and FIG. 4 highlights F.

Referring to FIG. 2, it is confirmed that the LiF—C composite had an overall amorphous-like shape. In addition, referring to FIG. 3 and FIG. 4 showing that C and F were distributed while overlapping a similar area, it is confirmed that LiF particles and carbon particles were uniformly dispersed in the LiF—C composite.

Figure 5:
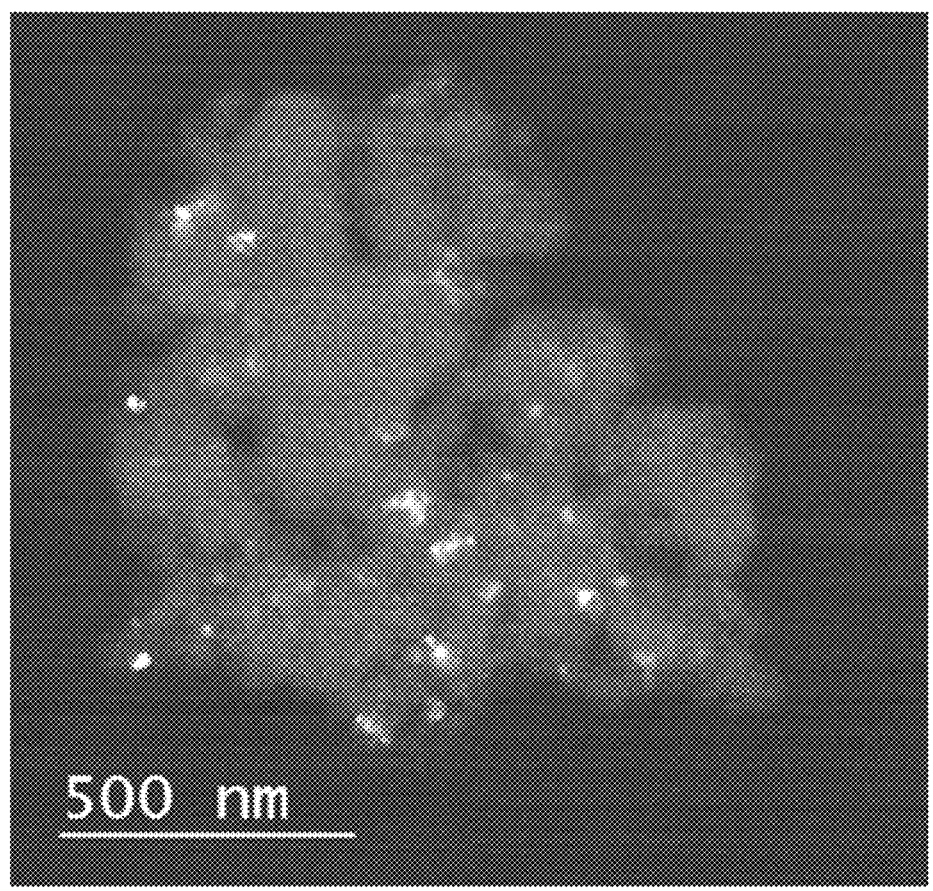
FIG. 5 is a dark field image showing a LiF—C composite according to a preparation example.

FIG. 5 shows a dark field image of the LiF—C composite according to a preparation example.

The light region in FIG. 5 indicates a signal that was diffracted and emitted from the LiF particle. Referring to FIG. 5, it is confirmed that LiF particles satisfied the particle diameter range.

Figure 6:
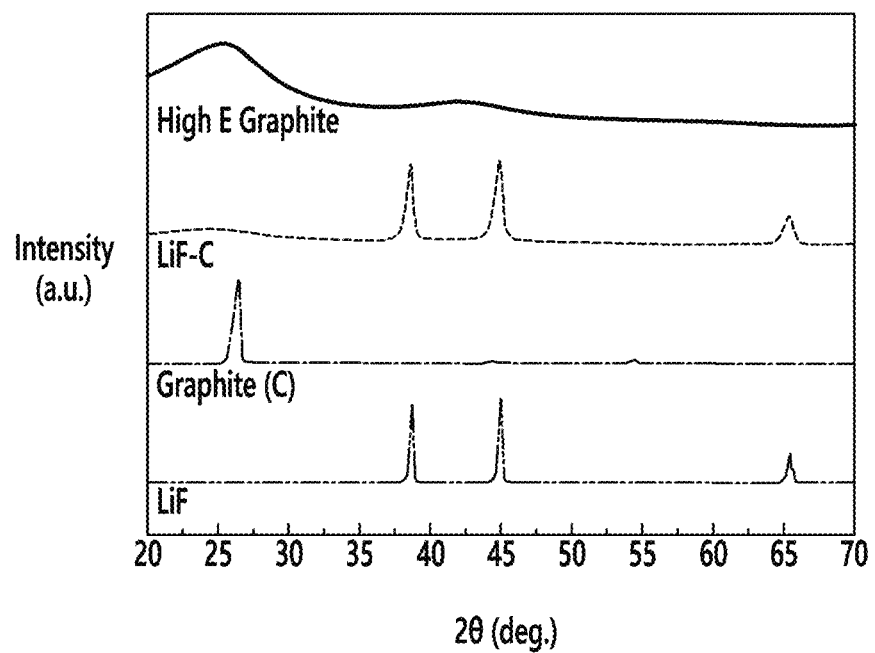
FIG. 6 is an XRF graph showing a LiF—C composite according to a preparation example together with XRD graphs of a high energy ball mill-treated graphite powder, an initial graphite powder, and an initial LiF powder.

FIG. 6 shows an XRD graph of a LiF—C composite according to a preparation example together with XRD graphs of a high energy ball mill-treated graphite powder, an initial graphite powder, and an initial LiF powder.

Referring to FIG. 6, it is understood that the XRD peak pattern of the LiF—C composite corresponded overall to the initial LiF powder, but was different from the initial graphite powder and the high energy ball mill-treated graphite powder. In other words, it is confirmed that the Li—F particle maintained crystallinity in the LiF—C composite, but the graphite powder was somewhat amorphized by the high energy ball mill treatment.

However, the peak pattern of the LiF—C composite was somewhat widened compared to the initial LiF powder, meaning that the crystallinity of the LiF particle was slightly weakened through the high energy ball mill process compared to the initial LiF powder.

Example 1

Preparation of LiF—C+$Mn_3O_4$ Composite for Cathode Materials (1)

$Mn_3O_4$ powder synthesized using hot injection and having an average particle diameter of about 6 nm was added into the LiF—C composite obtained from the preparation example, and was simply mixed using planetary ball mill equipment (Fritsch, Pulverisette 23) to provide a LiF—C+$Mn_3O_4$ composite for a cathode material according to Example 1.

Measurement Example 2

Microstructure of Cathode Material According to Example 1

Figure 7:
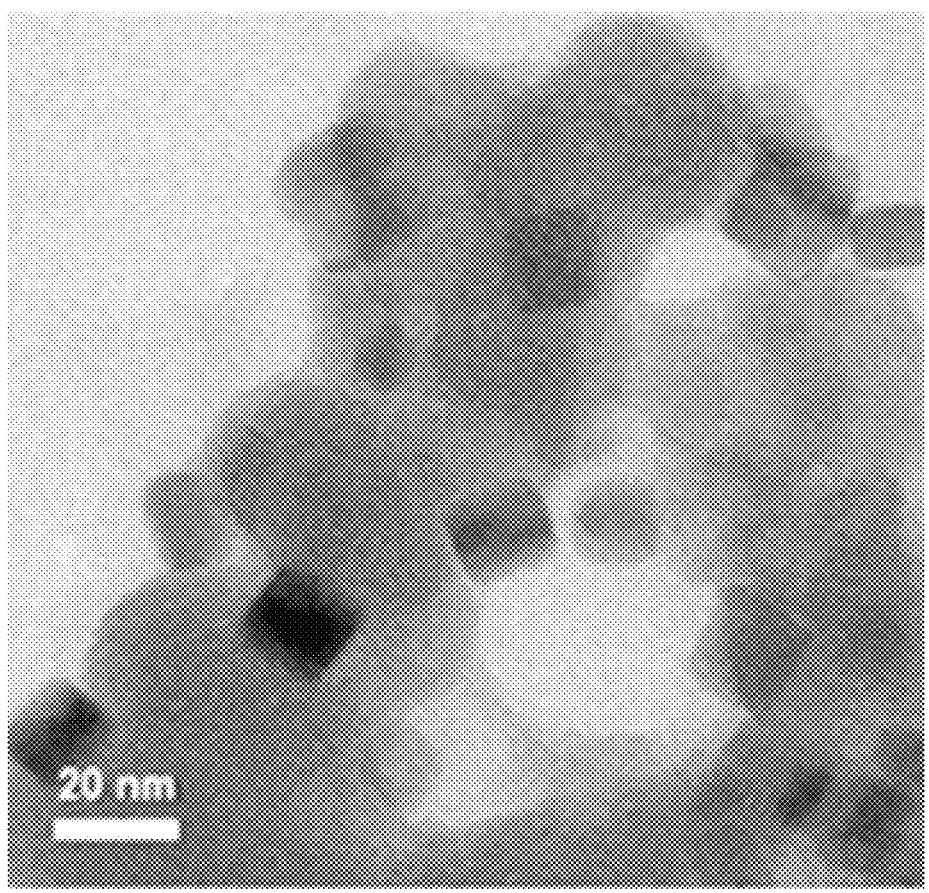
FIG. 7 is a TEM (transmission electron microscopy) image showing a cathode material according to Example 1.
Figure 8:
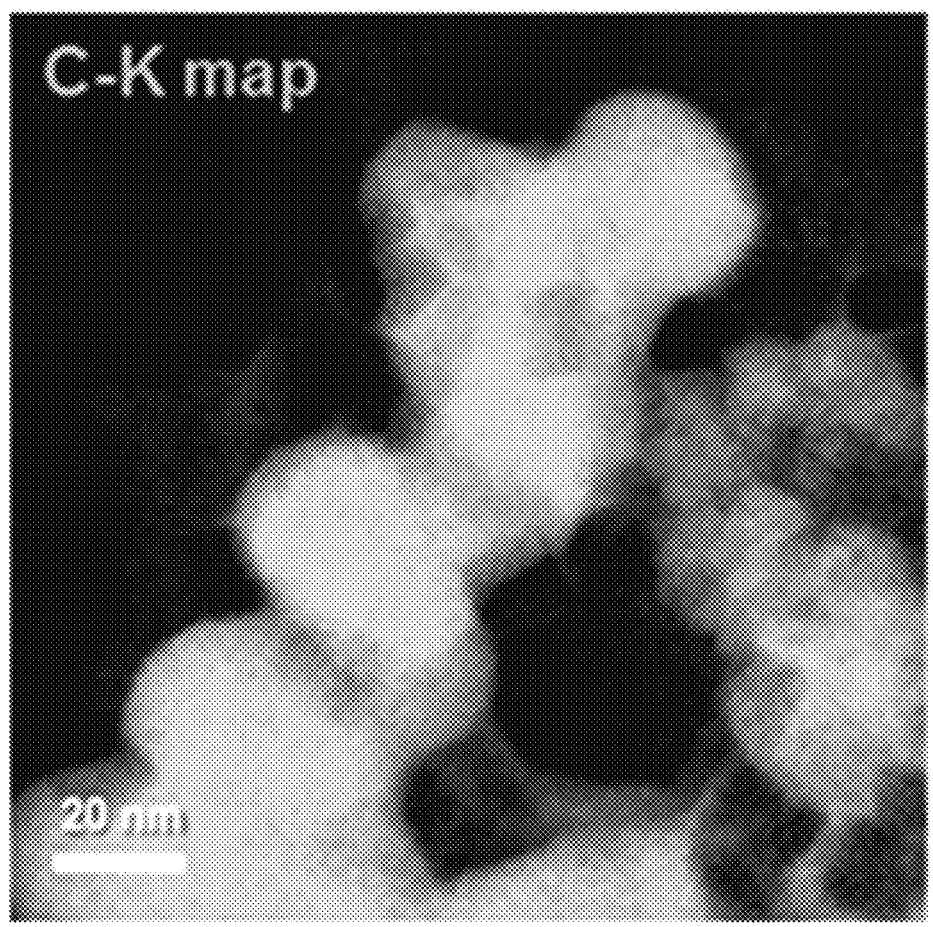
FIG. 8 to FIG. 11 show mapping of the TEM image shown in FIG. 7 while highlighting each element in the composite materials for cathode materials in a secondary battery, where FIG. 8 highlights C, FIG. 9 highlights Li, FIG. 10 highlights F, and FIG. 11 highlights Mn.
Figure 9:
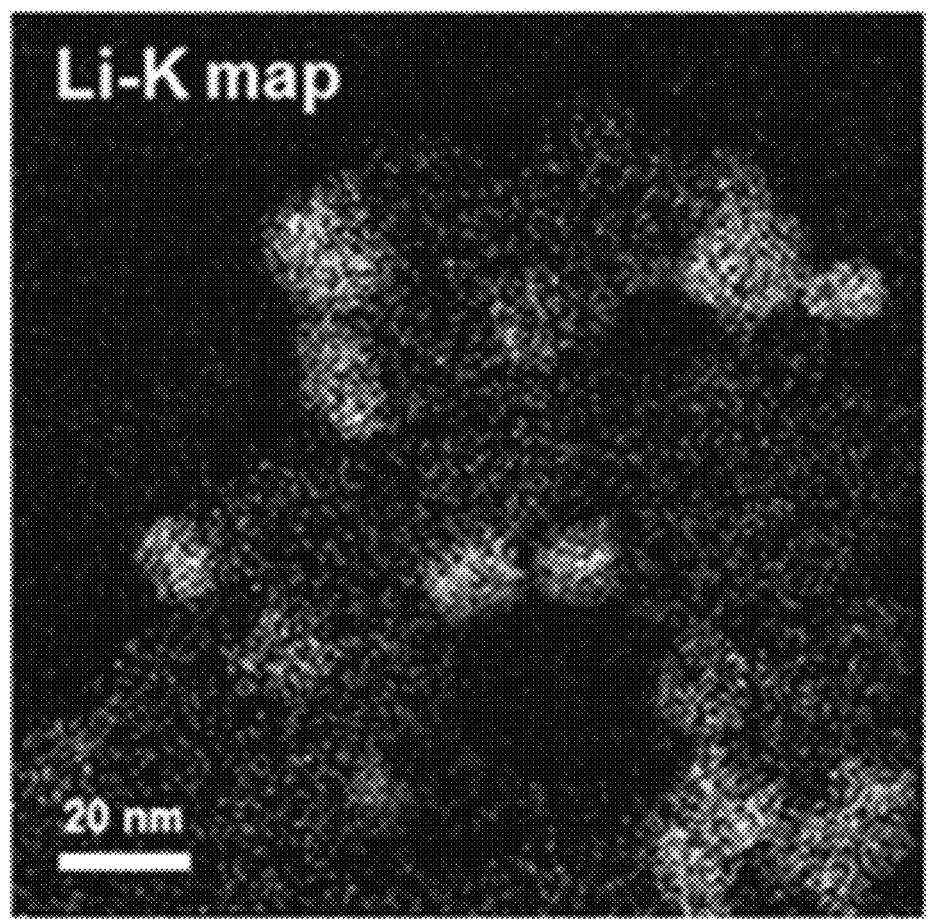
Figure 10:
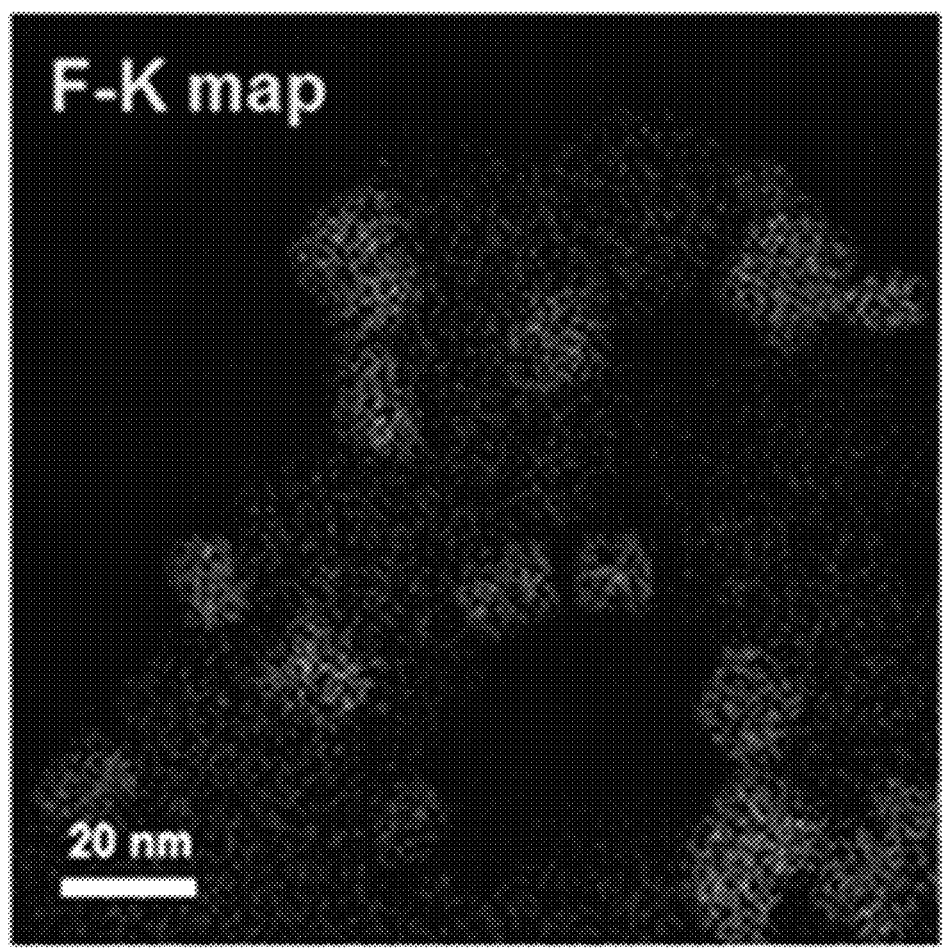
Figure 11:
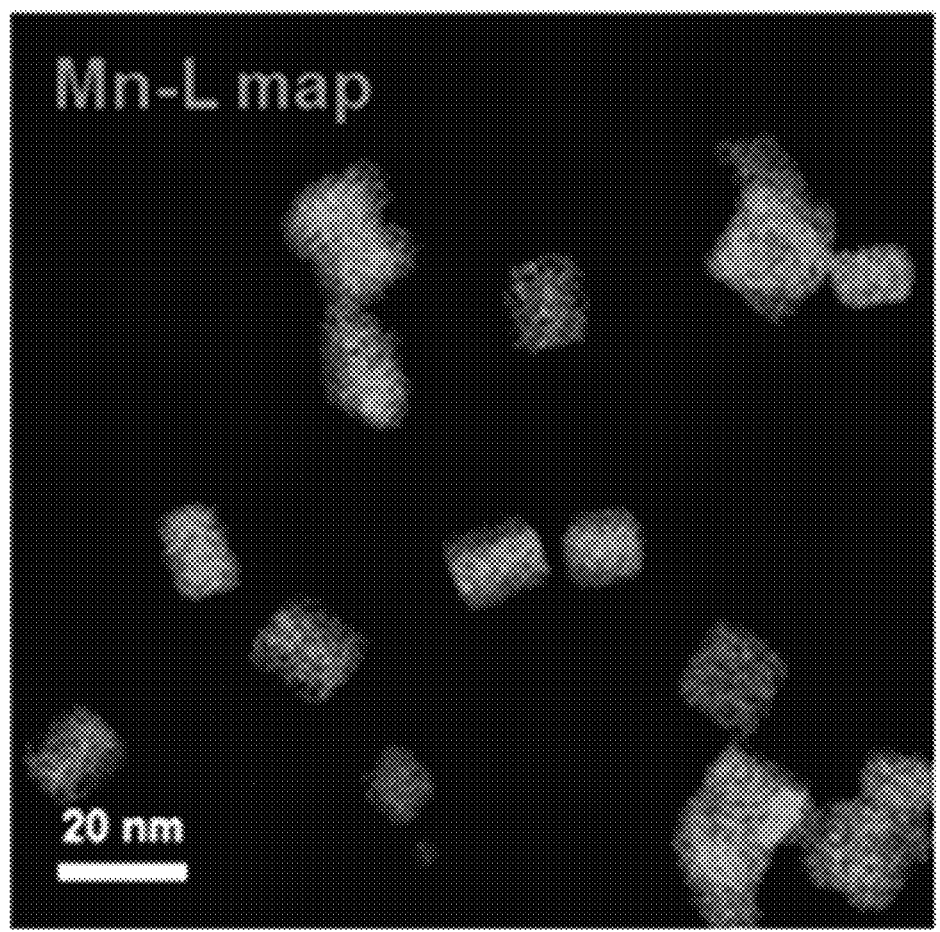

FIG. 7 shows a TEM (transmission electron microscopy) image of cathode materials according to Example 1; FIG. 8 to FIG. 11 show mapping of the TEM image of FIG. 7 while highlighting each element in composite materials for cathode materials in a secondary battery, where FIG. 8 highlights C, FIG. 9 highlights Li, FIG. 10 highlights F, and FIG. 11 highlights Mn.

Referring to FIG. 7, it is confirmed that $Mn_3O_4$ was dispersed in a LiF—C composite matrix, and the LiF—C composite and $Mn_3O_4$ had phases that were distinguished from each other in cathode materials according to Example 1. In addition, it is confirmed that the LiF—C composite surrounded the surface of $Mn_3O_4$.

Referring to FIG. 8 to FIG. 11, it is confirmed that LiF particles were mixed with carbon particles in cathode materials according to Example 1, but the distribution density was higher on the surface of $Mn_3O_4$.

Example 2

Preparation of LiF—C+$Mn_3O_4$ Composite for Cathode Materials (2)

A LiF—C+$Mn_3O_4$ composite material for cathode materials according to Example 2 was prepared in accordance with the same procedure as in Example 1, except for using $Mn_3O_4$ powder having an average particle diameter of about 9 nm.

Example 3

Preparation of LiF—C+$Mn_3O_4$ Composite for Cathode Materials (3)

A LiF—C+$Mn_3O_4$ composite material for cathode materials according to Example 3 was prepared in accordance with the same procedure as in Example 1, except for using $Mn_3O_4$ powder having an average particle diameter of about 11 nm.

Example 4

Preparation of LiF—C+$Mn_3O_4$ Composite for Cathode Materials (4)

A LiF—C+$Mn_3O_4$ composite material for cathode materials according to Example 4 was prepared in accordance with the same procedure as in Example 1, except for using $Mn_3O_4$ powder having an average particle diameter of about 15 nm.

Example 5

Preparation of LiF—C+$Mn_3O_4$ Composite for Cathode Materials (5)

A LiF—C+$Mn_3O_4$ composite material for cathode materials according to Example 5 was prepared in accordance with the same procedure as in Example 1, except for using $Mn_3O_4$ powder having an average particle diameter of about 18 nm.

Example 6

Preparation of LiF—C+$Mn_3O_4$ Composite for Cathode Materials (6)

A LiF—C+$Mn_3O_4$ composite material for cathode materials according to Example 6 was prepared in accordance with the same procedure as in Example 1, except for using $Mn_3O_4$ powder having an average particle diameter of about 20 nm.

Example 7

Preparation of LiF—C+MnO Composite for Cathode Materials

MnO powder (Sigma Aldrich, CAS No. 1344-43-0) having an average particle diameter of about 250 microns was added into the LiF—C composite obtained from the preparation example, and was then simply mixed using planetary ball mill equipment (Fritsch, Pulverisette 23) to provide a LiF—C+MnO composite for cathode materials according to Example 7.

Measurement Example 3

Change of Cathode Including Cathode Materials According to Example 7 During Charge/Discharge For the cathode materials according to Example 7 (0.085 g of a LiF—C composite, and 0.125 g of MnO), 10 wt % (0.03 g) of a polyacrylonitrile binder, 1 mL of an NMP solvent, and 20 wt % (0.06 g) of a Super P carbon conductive material were mixed to provide a slurry, the slurry was coated on an aluminum substrate, and then the solvent was evaporated to provide a cathode including cathode materials according to Example 7.

A half-cell was then fabricated using the cathode and a counter electrode including a lithium metal. The half-cell included a separator including a non-aqueous electrolyte (EC and DMC were mixed at a volume ratio of 1:1, and 1 M of $LiPF_6$ was included) and a polymer film.

When the half-cell including the cathode including cathode materials according to Example 7 was charged and discharged by applying a current density of 50 mA/g within the range of about 2 V to about 4.8 V, it was determined how much F was distributed on the surface of MnO in the cathode, and the results are shown in each of FIGS. 12 to 15.

Figure 12:
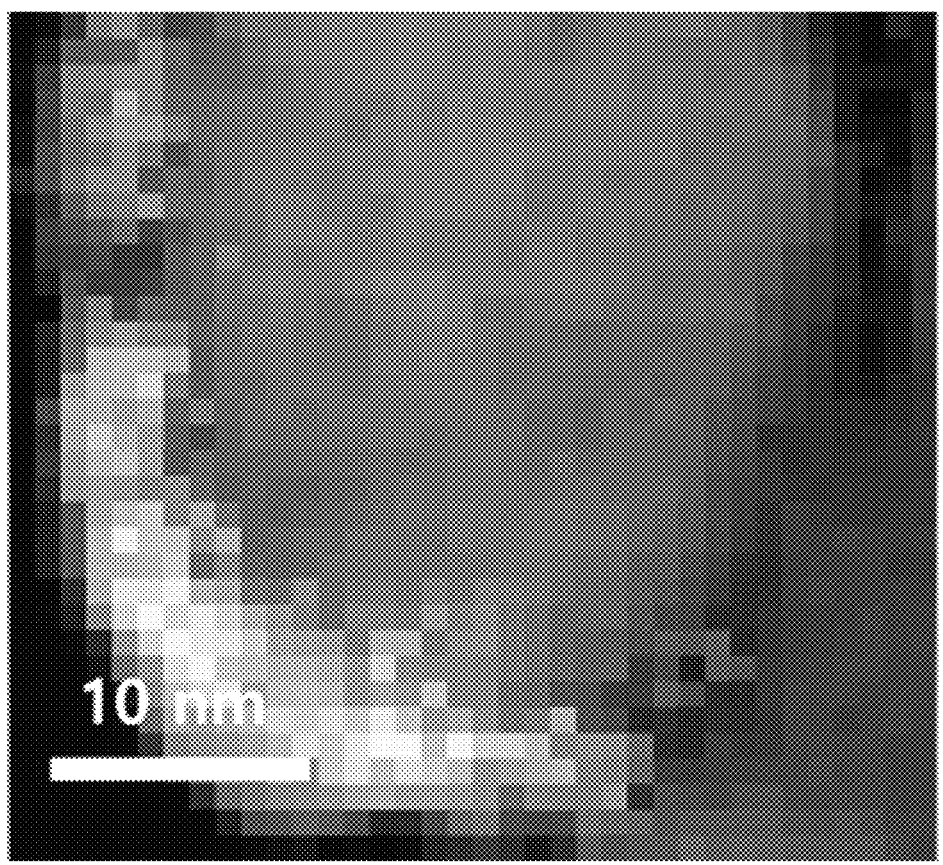
FIG. 12 is an image enlarging an area adjacent to MnO in a cathode when the cathode including cathode materials according to Example 7 is charged.
Figure 13:
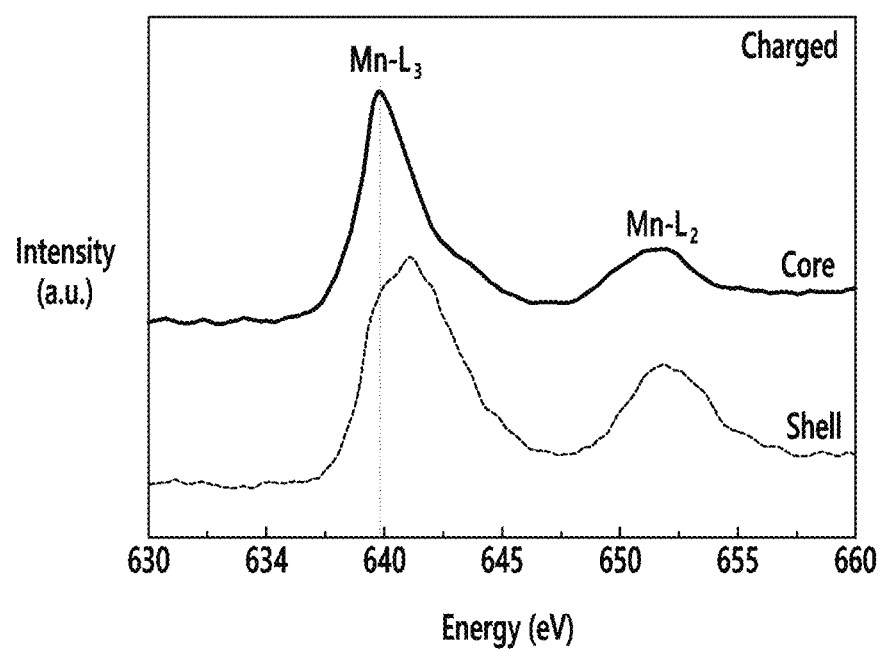
FIG. 13 is an image showing EELS (electron energy loss spectroscopy) results at a core and on a surface of MnO when the cathode including cathode materials according to Example 7 is charged.

FIG. 12 is an image enlarging an area adjacent to MnO in the cathode in a state that the cathode including cathode materials according to Example 7 was charged, and FIG. 13 is an image showing EELS (electron energy loss spectroscopy) results of a core and a surface of MnO at a state in which the cathode including the cathode material according to Example 7 was charged.

In FIG. 12, MnO is highlighted as a dark gray region, and F is highlighted as a light gray region.

Referring to FIG. 12, it is confirmed that F was generally distributed on the surface of MnO in the cathode including cathode materials according to Example 7, and from FIG. 13 showing that the peak pattern at the surface of MnO was shifted to a right side compared to the peak pattern in the center part of MnO, it is confirmed that F was chemically bonded on the surface of MnO.

Figure 14:
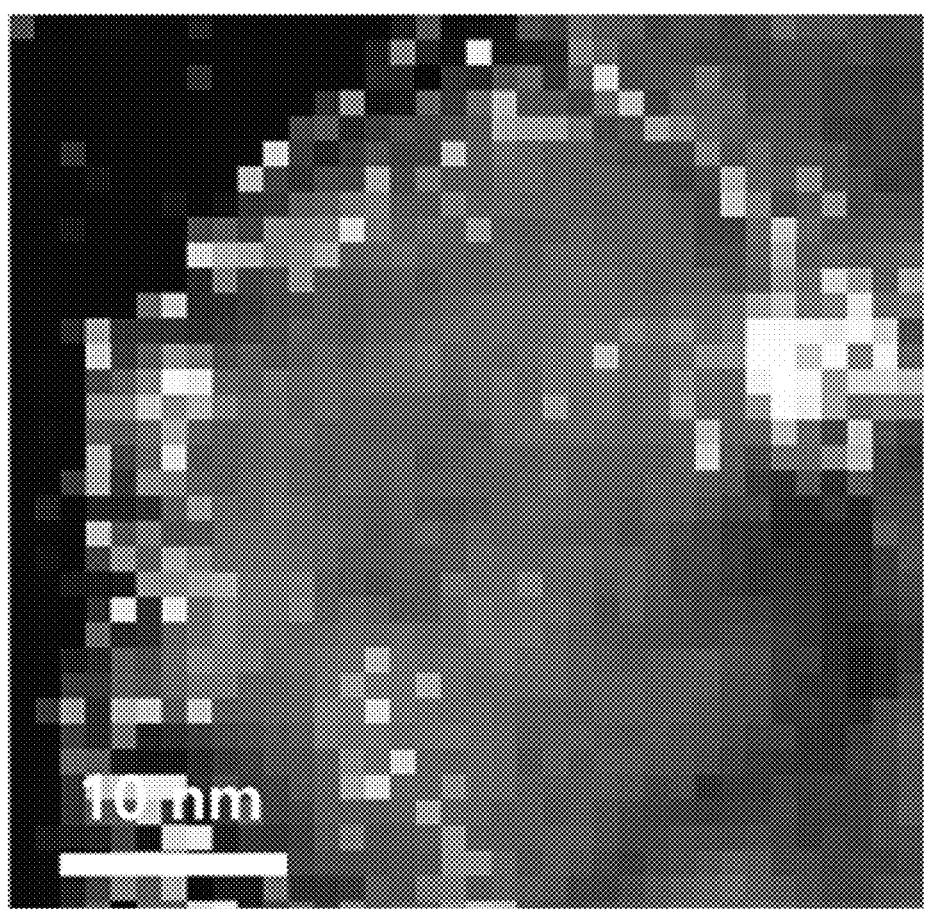
FIG. 14 is an image enlarging an area adjacent to MnO in a cathode when the cathode including cathode materials according to Example 7 is discharged.
Figure 15:
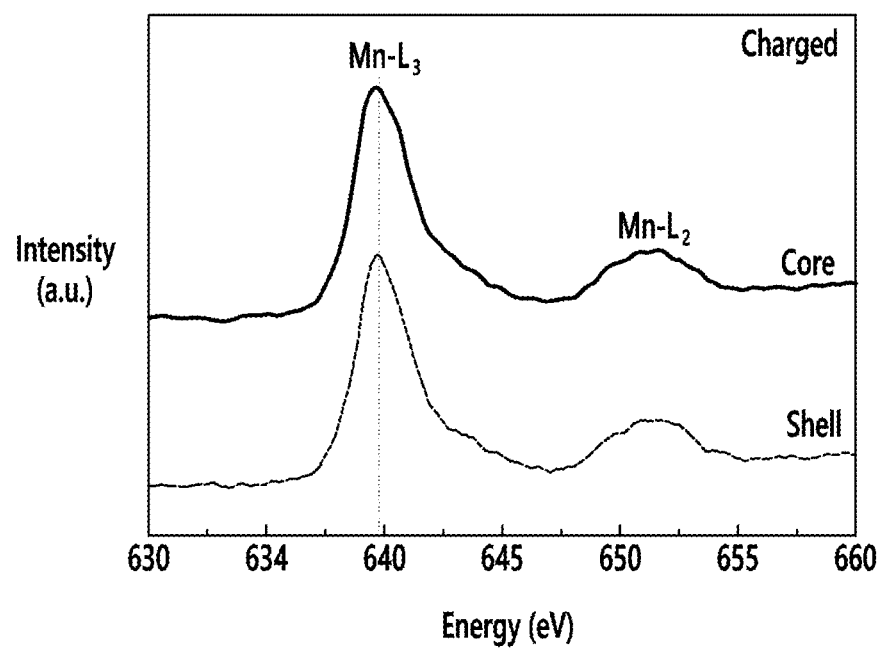
FIG. 15 is an image showing EELS (electron energy loss spectroscopy) results at a core and on a surface of MnO when the cathode including cathode materials according to Example 7 is discharged.

FIG. 14 is an image enlarging an area adjacent to MnO in the cathode in a state that the cathode including cathode materials according to Example 7 was discharged, and FIG. 15 is an image showing EELS results at a core and on a surface of MnO in a state that the cathode including cathode materials according to Example 7 was discharged.

FIG. 14 shows MnO as a dark gray region and shows F as a light gray region, as in FIG. 12.

Referring to FIG. 15, it is confirmed that considerably less of the F was distributed on the surface of MnO in a state that the cathode including cathode materials according to Example 7 was discharged, compared to the charged state. In addition, referring to FIG. 16, it is confirmed that the peak pattern at the surface of MnO was almost identical to the peak pattern in the center of MnO. Accordingly, it is confirmed that F was separated from the surface of MnO in the discharge state.

In summary, the cathode including cathode materials according to Example 7 may be charged and discharged according to Reaction Scheme 3.

Example 8

Preparation of LiF—C+FeO Composite for Cathode Materials

FeO powder (Sigma Aldrich, CAS No. 1345-25-1) having an average particle diameter of about 2000 microns was added into the LiF—C composite obtained from the preparation example, and then simply mixed using planetary ball mill equipment (Fritsch, Pulverisette 23) to provide a LiF—C+FeO composite for cathode materials according to Example 8.

Example 9

Preparation of LiF—C+CoO Composite for Cathode Materials

CoO powder (Sigma Aldrich, CAS No. 1307-96-6) having an average particle diameter of about 44 microns was added into the LiF—C composite obtained from the preparation example, and then simply mixed using planetary ball mill equipment (Fritsch, Pulverisette 23) to provide a LiF—C+CoO composite for cathode materials according to Example 9.

Example 10

Preparation of KF—C+MnO Composite for Cathode Materials

A KF—C composite was obtained in accordance with the same procedure as in the preparation example, except that KF powder (Sigma Aldrich, CAS No. 7789-23-3) was used instead of LiF powder.

MnO powder (Sigma Aldrich, CAS No. 1344-43-0) having an average particle diameter of about 250 microns was added into the obtained KF—C composite, and then simply mixed using planetary ball mill equipment (Fritsch, Pulverisette 23) to provide a KF—C+MnO composite for cathode materials according to Example 10.

Example 11

Preparation of NaF—C+MnO Composite Material for Cathode Material

A NaF—C composite was obtained in accordance with the same procedure as in the preparation example, except that NaF powder (Sigma Aldrich, CAS No. 7681-49-4) was used instead of LiF powder.

MnO powder (Sigma Aldrich, CAS No. 1344-43-0) having an average particle diameter of about 250 microns was added into the obtained NaF—C composite, and then simply mixed using planetary ball mill equipment (Fritsch, Pulverisette 23) to provide a NaF—C+MnO composite for cathode materials according to Example 11.

Comparative Example 1

Preparation of $LiF+C+Mn_3O_4$ Mixture for Cathode Materials

LiF powder (Sigma-Aldrich) having a particle diameter range from about 1 micron to about 2 microns, graphite powder (Alfa Aesar) having a particle diameter range from about 1 micron to about 20 microns, and $Mn_3O_4$ powder having a particle diameter range from about 6 microns to about 20 microns were simply mixed at room temperature using planetary ball mill equipment (Fritsch, Pulverisette 23) to provide a $LiF+C+Mn_3O_4$ mixture for cathode materials according to Comparative Example 1. In the mixture for cathode materials according to Comparative Example 1, micro-scaled LiF powder and graphite powder and nanometer size $Mn_3O_4$ powder were physically mixed without forming an additional chemical bond therebetween.

Comparative Example 2

Preparation of LiF+High-Energy Ball Milled $C+Mn_3O_4$ Mixture for Cathode Materials Graphite powder (Alfa Aesar) having a particle diameter range from about 1 micron to about 20 microns was introduced into planetary ball mill equipment (Fritsch, Pulverisette 5) and mixed in a high energy ball mill under an Ar atmosphere at a speed of about 400 rpm for about 48 hours without an idle period to provide an amorphous carbon particle assembly having a particle diameter of about 10 nm to about 50 nm. The obtained amorphous carbon particle assembly and LiF powder (Sigma-Aldrich) having an average particle diameter of about 1 micron to about 2 microns and $Mn_3O_4$ powder having an average particle diameter of about 6 microns to about 20 microns were then simply mixed using planetary ball mill equipment (Fritsch, Pulverisette 23) at room temperature to provide a LiF+high-energy ball milled C+$Mn_3O_4$ mixture according to Comparative Example 2. The mixture for cathode materials according to Comparative Example 2 had a structure in which micro-scaled LiF powder and nanometer size $Mn_3O_4$ powder were dispersed in a nanometer size amorphous carbon particle assembly, but they were physically mixed without forming an additional chemical bond therebetween.

Comparative Example 3

Preparation of LiF+MnO Composite for Cathode Materials

LiF powder (Sigma-Aldrich) having a particle diameter range from about 1 micron to about 2 microns and MnO powder having an average particle diameter of about 250 microns were introduced into planetary ball mill equipment (Fritsch, Pulverisette 5) and mixed in a high energy ball mill under an Ar atmosphere at a speed of about 500 rpm for about 48 hours without an idle period to provide a LiF+MnO composite. In cathode materials according to Comparative Example 3, the pulverized LiF particles and MnO particles were uniformly mixed. In Comparative Example 3, the carbon precursor was not added during the high energy ball milling, unlike in Example 1.

Evaluation 1

Evaluation of Electrochemical Activity of Cathodes Including Cathode Materials According to Examples 1 to 6

With cathode materials according to Examples 1 to 6, a cathode and a half-cell were fabricated in accordance with the same procedure as in Measurement Example 3.

Figure 16:
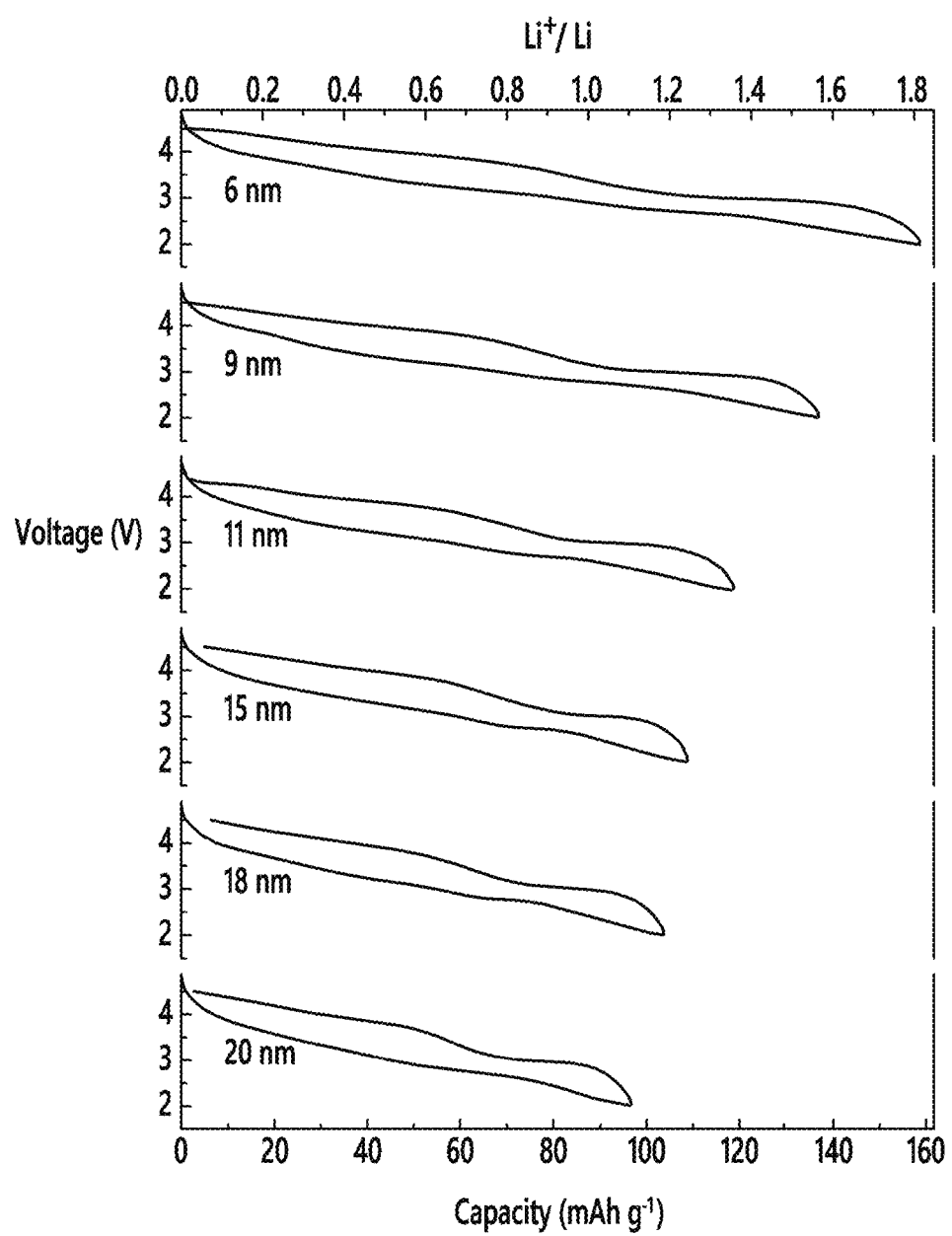
FIG. 16 is a graph showing electrochemical activity of a cathode of a LiF—C+$Mn_3O_4$ composite according to a variety of average particle diameters of $Mn_3O_4$.

Then, for cathodes including cathode materials according to Examples 1 to 6 and Comparative Examples 1 and 2, the charge/discharge characteristics were measured when applying a half-cell with a current density of 20 mA/g in a range of about 2 V to 4.8 V, and the results are shown in FIG. 16.

FIG. 16 is a graph showing electrochemical activity of a LiF—C+$Mn_3O_4$ composite cathode depending upon various average particle diameters of $Mn_3O_4$.

Referring to FIG. 16, it is understood that even $Mn_3O_4$, which has generally not been used for cathode materials, may be used for a cathode for a secondary battery by being mixed with a LiF—C composite.

In addition, as $Mn_3O_4$ has a larger average particle diameter going from Example 1 to Example 6, the half-cell may have a gradually lesser specific capacity.

From the results, it is confirmed that the average particle diameter of the transition metal compound may be variously adjusted according to usage of the lithium secondary battery, a kind of the charge carrier ion compound, and the like, and thereby the electrochemical activity of the cathode may be controlled.

Evaluation 2

Evaluation of Electrochemical Activity of Cathodes Including Cathode Materials According to Examples 7 to 9

Figure 17:
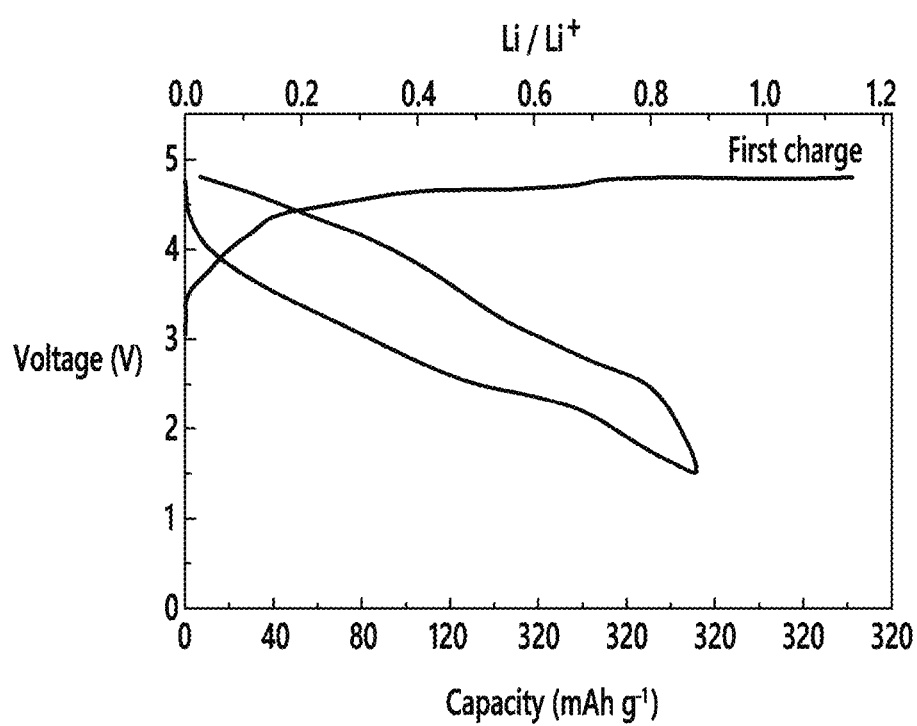
FIG. 17 to FIG. 19 are graphs showing electrochemical activity of cathodes including cathode materials according to Examples 7 to 9, respectively.
Figure 18:
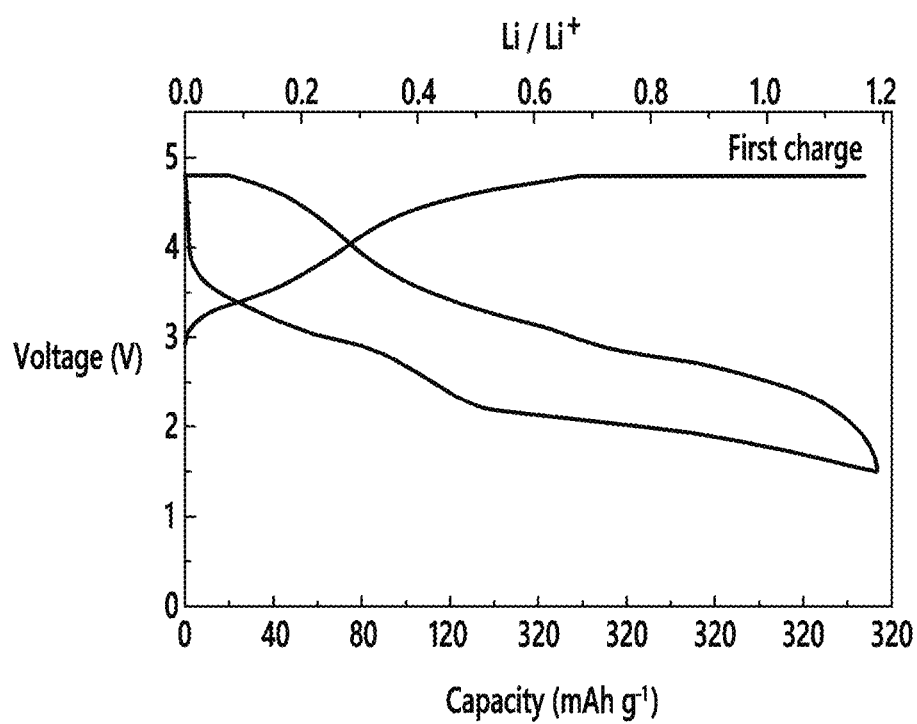
Figure 19:
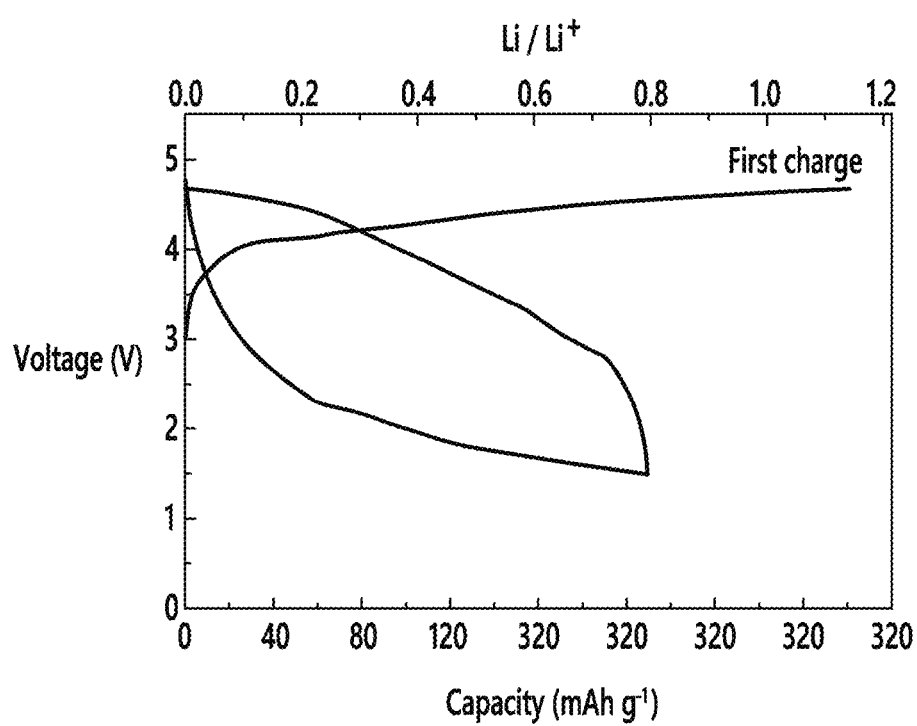

With cathode materials according to Examples 7 to 9, a cathode and a half-cell were fabricated in accordance with the same procedure as in Evaluation 1, the charge/discharge characteristics of the obtained half-cell were measured when applied with a current density of 20 mA/g within a range of 1.5 V to 4.8 V, and the results are shown in FIGS. 17 to 19.

FIG. 17 to FIG. 19 are graphs showing electrochemical activities of cathodes including cathode materials according to Examples 7 to 9, respectively.

Referring to FIG. 17 to FIG. 19, it is confirmed that all cathodes including cathode materials according to Examples 7 to 9 showed similar charge/discharge aspects to those of Examples 1 to 6, and they had a specific capacity of about 240 mAh/g (Example 7), about 320 mAh/g (Example 8), and about 220 mAh/g (Example 9), respectively.

From Evaluation 2, it is confirmed that even if using MnO, FeO, CoO, or the like as well as $Mn_3O_4$ as a transition metal compound, it may work as a cathode of the secondary battery according to one embodiment.

Evaluation 3

Evaluation of Electrochemical Activity of Cathodes Including Cathode Materials According to Examples 10 and 11

Figure 20:
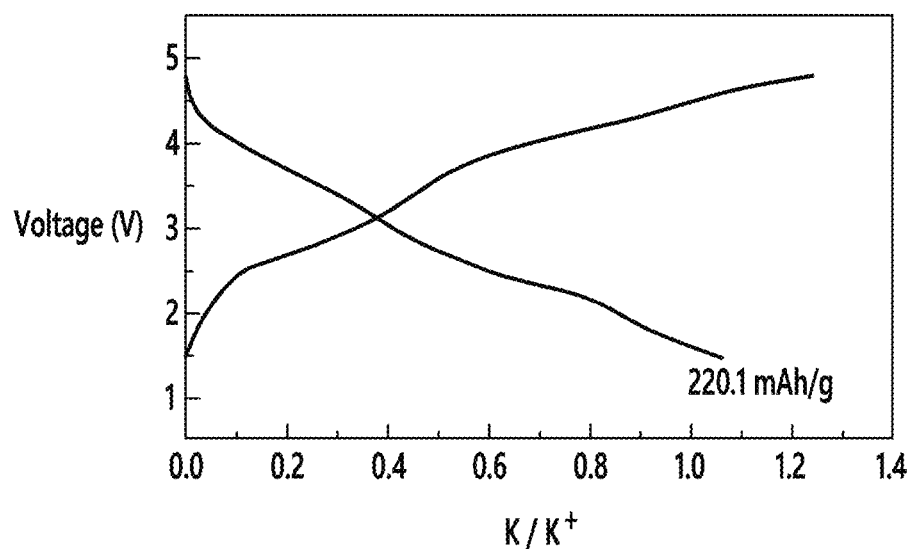
FIG. 20 and FIG. 21 show graphs showing $A^{m+}/A$ change depending upon a voltage change of cathodes including cathode materials according to Examples 10 and 11, respectively.
Figure 21:
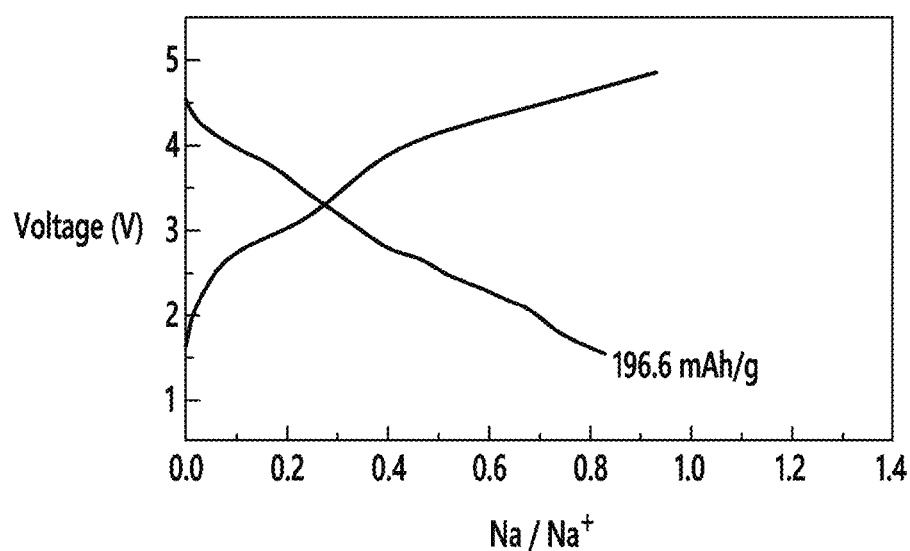

A cathode and a half-cell were fabricated in accordance with the same procedure as in Evaluation 1, with each of cathode materials according to Examples 10 and 11, the obtained half-cell was measured for $A^{m+}/A$ change depending upon voltage change when applying the half-cell with a current density of 50 mA/g within a range of about 1.5 V to 4.8 V, and the results are shown in FIGS. 20 and 21, respectively.

FIGS. 20 and 21 are graphs showing $A^{m+}/A$ changes of cathodes including cathode materials according to Examples 10 and 11 depending upon a voltage change, where FIG. 20 shows $K^+/K$ and FIG. 21 shows $Na^+/Na$.

Referring to FIGS. 20 and 21, it is confirmed that all cathodes including cathode materials according to Examples 10 and 11 showed charge/discharge behavior. The results of measuring a specific capacity of Examples 10 and 11 are about 220.1 mAh/g and about 196.6 mAh/g, respectively, which are sufficiently satisfactory capacity characteristics to be employed for a secondary battery.

From Evaluation 3, it is confirmed that even in the case of using a potassium-based compound, a sodium-based compound, and the like, as well as a lithium-based compound, as a charge carrier ion, it may work as a cathode for a secondary battery according to one embodiment.

Evaluation 4

Evaluation of Electrochemical Activity of Cathodes Including Cathode Materials According to Comparative Examples 1 and 2

With cathode materials according to Comparative Examples 1 and 2, a cathode and a half-cell were fabricated in accordance with the same procedure as in Measurement Example 3.

Then, for the cathodes including cathode materials according to Comparative Examples 1 and 2, the charge/discharge characteristics of the obtained half-cell were measured when applying a current density of 50 mA/g within a range of about 2 V to 4.8 V.

From the measurement results, both Comparative Examples 1 and 2 did not show sufficient electrochemical activity to be charged/discharged. This is considered to be because $Mn_3O_4$, which had been not suitably used for the conventional cathode material, was simply mixed with LiF and carbon particles in both Comparative Examples 1 and 2.

In addition, from the results of Comparative Example 2, it is understood that it did not show electrochemical activity when subjecting only a carbon precursor to a high energy ball mill treatment and mixing the same with $Mn_3O_4$ or LiF. Thereby, it is confirmed that it did not show electrochemical activity according to Reaction Scheme 3 when LiF was not pulverized into a nanometer size by a high energy ball mill.

Evaluation 5

Evaluation of Electrochemical Activity of Cathode Including Cathode Materials According to Comparative Example 3

With the cathode materials according to Comparative Example 3, a cathode and a half-cell were fabricated in accordance with the same procedure as in Measurement Example 3. Then the charge/discharge characteristics of the obtained half-cell were measured under the same conditions as in Evaluation 1, and the results are shown in FIG. 22.

Figure 22:
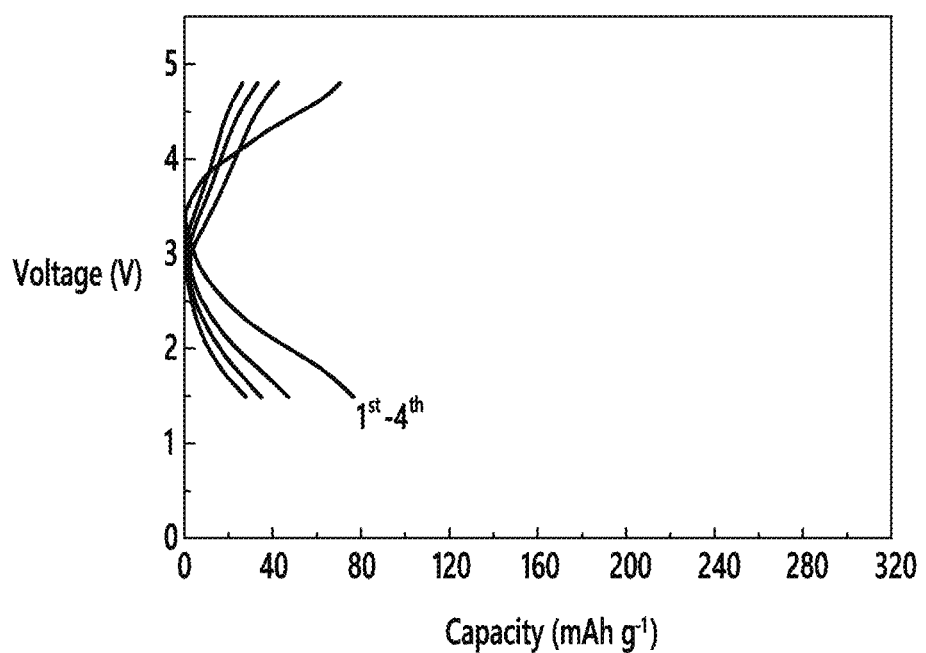
FIG. 22 is a graph showing electrochemical activity of a cathode including cathode materials according to Comparative Example 3.

FIG. 22 is a graph showing electrochemical activity of a cathode including cathode materials according to Comparative Example 3.

Referring to FIG. 22, it is confirmed that the capacity characteristics were remarkably deteriorated according to repeating the number of charges with the cathode including cathode materials according to Comparative Example 3. That is, it is confirmed that the electrochemical activity according to Reaction Scheme 3 did not occur well although only LiF was pulverized into a nanometer size. This phenomenon is basically caused by LiF properties of weak conductivity and strong electrical insulation.

Thereby, it is understood that only in the cases of examples in which both LiF and the carbon precursor were pulverized into a nanometer size may the stable secondary battery characteristics be shown.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A composite material for a cathode material in a secondary battery, comprising:
   a charge carrier ion compound-carbon composite comprising a carbon particle and a charge carrier ion compound particle represented by a general formula of $A_xD_y$, and dispersed on a surface of the carbon particle, wherein the charge carrier ion compound-carbon composite is prepared by mechanochemically mixing a precursor of the charge carrier ion compound and a precursor of the carbon, wherein each of the charge carrier ion compound particle and the carbon particle has a particle diameter of about 1 nm to about 100 nm, and the charge carrier ion compound particle is uniformly mixed with the carbon particle in the charge carrier ion compound-carbon composite; and
   a transition metal compound represented by a general formula of $M_zR_w$, the transition metal compound is physically mixed with the charge carrier ion compound-carbon composite,
   wherein the A is selected from Li, Na, K, Rb, Cs, Be, Mg, Ca, Sr, and Ba,
   the D is selected from F, N, Cl, S, P, Br, Se, I, and (OH),
   the M is selected from Fe, Mn, V, Co, Ni, Ti, Nb, Mo, Y, Ag, Hf, and Ta,
   the R is selected from O,
   provided that when M is Fe, $0<x\leq3$, $0<y\leq2$, $0<z\leq4$, and $0<w\leq6$,
   wherein, the charge carrier ion compound-carbon composite and the transition metal compound have phases that are distinguished from each other; and
   the transition metal compound has granularity or a crystal phase.

2. The composite material for the cathode materials in a secondary battery of claim 1, wherein the precursor of the charge carrier ion compound and the precursor of the carbon are mechanochemically mixed in a weight ratio of 1:0.3 to 1:3.

3. The composite material for the cathode materials in a secondary battery of claim 1, wherein
   the charge carrier ion compound-carbon composite is distributed at least adjacent to the surface of the transition metal compound.

4. The composite material for the cathode materials in a secondary battery of claim 1, wherein
   the carbon particle is an amorphous carbon particle.

5. The composite material for the cathode materials in a secondary battery of claim 1, wherein
   the carbon particle has a particle diameter of about 10 nm to about 100 nm.

6. The composite material for the cathode materials in a secondary battery of claim 1, wherein
   the charge carrier ion compound particle comprises a crystalline first particle and an amorphous second particle.

7. The composite material for the cathode materials in a secondary battery of claim 1, wherein
   the charge carrier ion compound particle has a particle diameter of about 5 nm to about 100 nm.

8. The composite material for the cathode materials in a secondary battery of claim 1, wherein the charge carrier ion compound particle includes at least one selected from the group consisting of LiF, $Li_3N$, LiI, LiCl, $Li_2S$, LiOH, $Li_2CO_3$, LiBr, $Li_3PO_4$, $Li_4P_2O_7$, $Li_2SO_4$, $Li_2CO_3$, $Li_4SiO_4$, KF, and NaF.

9. The composite material for the cathode materials in a secondary battery of claim 1, wherein the transition metal compound having crystallinity.

10. The composite material for the cathode material in a secondary battery of claim 1, wherein the transition metal compound includes at least one selected from the group consisting of MnO, $Mn_2O_3$, $Mn_3O_4$, CoO, $Co_3O_4$, FeO, $Fe_2O_3$, $Fe_3O_4$, $V_2O_5$, NiO, $Nb_2O_5$, and $MoO_3$.

11. The composite material for a cathode material in a secondary battery of claim 1, wherein
    the transition metal compound has an average particle diameter of about 6 nm.

12. A method of manufacturing composite materials for cathode materials in a secondary battery of claim 1, comprising:

mixing a charge carrier ion compound precursor and a carbon precursor using a mechanochemical reaction to provide the charge carrier ion compound-carbon composite; and adding the transition metal compound into the charge carrier ion compound-carbon composite.

13. The method of manufacturing composite materials for cathode materials in a secondary battery of claim 12, wherein the mechanochemical reaction is performed using a high energy ball mill.

14. The method of manufacturing composite materials for cathode materials in a secondary battery of claim 12, comprising further adding at least one of a binder, a conductive material, and a solvent when adding the transition metal compound.

15. The method of manufacturing composite materials for cathode materials in a secondary battery of claim 12, comprising mixing the charge carrier ion compound-carbon composite and the transition metal compound using physical agitation.

16. A lithium secondary battery comprising:
an electrolyte;
an anode;
a cathode; and
a separator;
wherein the cathode comprising a composite material, the composite material comprising a charge carrier ion compound-carbon composite comprising a carbon particle and a charge carrier ion compound particle represented by a general formula of $A_xD_y$ and dispersed on a surface of the carbon particle, wherein the charge carrier ion compound-carbon composite is prepared by mechanochemically mixing a precursor of the charge carrier ion compound and a precursor of carbon, wherein each of the charge carrier ion compound particle and the carbon particle has a particle diameter of about 1 nm to about 100 nm, and the charge carrier ion compound particle is uniformly mixed with the carbon particle in the charge carrier ion compound-carbon composite, and a transition metal compound represented by a general formula of $M_zR_w$, the transition metal compound is physically mixed with the charge carrier ion compound-carbon composite;

wherein the A is selected from Li, Na, K, Rb, Cs, Be, Mg, Ca, Sr, and Ba, the D is selected from F, N, Cl, S, P, Br, Se, I, (OH), and ($CO_3$), the M is selected from Fe, Mn, V, Co, Ni, Ti, Nb, Mo, Y, Ag, Hf, and Ta, the R is O, provided that when M is Fe, $0<x\leq3$, $0<y\leq2$, $0<z\leq4$, and $0<w\leq6$, wherein, the charge carrier ion compound-carbon composite and the transition metal compound have phases that are distinguished from each other; and the transition metal compound have granularity or a crystal phase.

17. The lithium secondary battery of claim 16, wherein
the charge carrier ion is oxidized and reduced on the surface of the transition metal compound in the cathode.

18. The lithium secondary battery of claim 16, wherein
in a state that the lithium secondary battery is charged,
the charge carrier ion compound is separated into a charge carrier ion and an anion, and the anion is chemically bonded with the transition metal compound.

\* \* \* \* \*